United States Patent
Watanabe et al.

(10) Patent No.: US 7,257,052 B2
(45) Date of Patent: Aug. 14, 2007

(54) CONTROL APPARATUS AND OPTICAL DISK APPARATUS

(75) Inventors: Katsuya Watanabe, Nara (JP); Yu Okada, Moriguchi (JP); Akihiro Hatsusegawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 768 days.

(21) Appl. No.: 10/358,642

(22) Filed: Feb. 5, 2003

(65) Prior Publication Data
US 2003/0151987 A1 Aug. 14, 2003

(30) Foreign Application Priority Data
Feb. 5, 2002 (FR) .............................. 2002-027832

(51) Int. Cl.
*G11B 7/00* (2006.01)
(52) U.S. Cl. .............................. 369/44.26; 369/53.28; 369/44.25
(58) Field of Classification Search ............. 369/44.26, 369/44.29, 32.01, 44.34, 44.35, 44.28, 47.1, 369/53.11, 53.3, 53.22, 53.23, 53.35, 53.28, 369/53.41, 44.27, 275.3, 44.32, 53.12, 44.25
See application file for complete search history.

(56) References Cited
U.S. PATENT DOCUMENTS 5,878,007 A * 3/1999 Matsumoto et al. ..... 369/44.34
6,240,055 B1 * 5/2001 Takamine et al. ........ 369/44.29
6,345,021 B1 * 2/2002 Belser et al. .............. 369/47.1
6,381,201 B1 * 4/2002 Shihara et al. ........... 369/32.01
7,016,272 B2 * 3/2006 Enokihara ................. 369/44.29

FOREIGN PATENT DOCUMENTS
JP 2000-315327 11/2000

* cited by examiner

Primary Examiner—Andrea Wellington
Assistant Examiner—Kim-Kwok Chu
(74) Attorney, Agent, or Firm—Akin Gump Strauss Hauer & Feld LLP

(57) ABSTRACT

A tracking control apparatus comprises an signal processing section, a lens characteristic measuring section and an optimum lens position searching section. The lens characteristic measuring section acquires a first address and second address of an optical disk. The lens characteristic measuring section successively generates offset set values so that the position of a converging lens is moved by an actuator at predetermined spatial intervals and counts the number of times both the first address and the second address are acquired. The optimum lens position searching section searches for a maximum value of the acquisition count and moves the converging lens using the actuator based on the offset set value when the acquisition count reaches a maximum value.

40 Claims, 23 Drawing Sheets

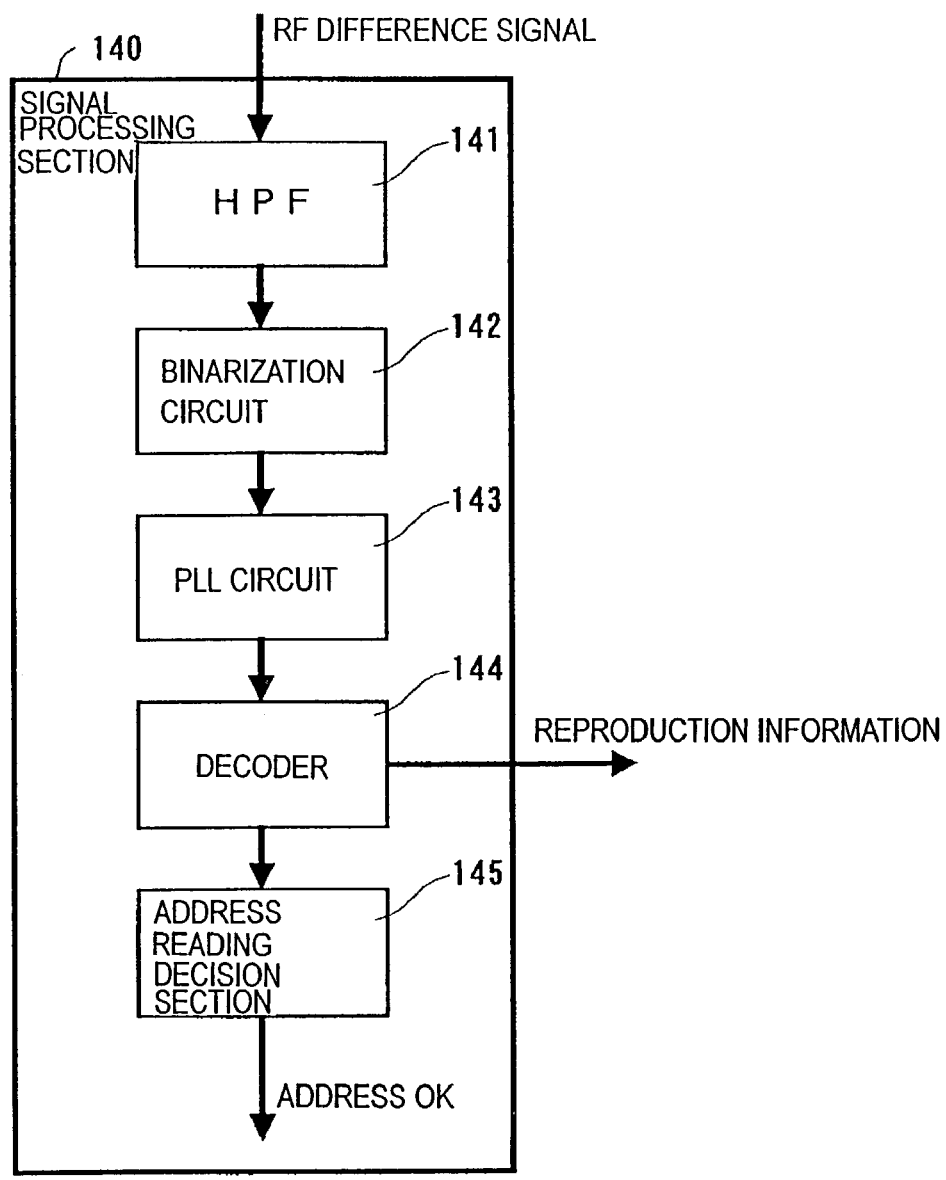
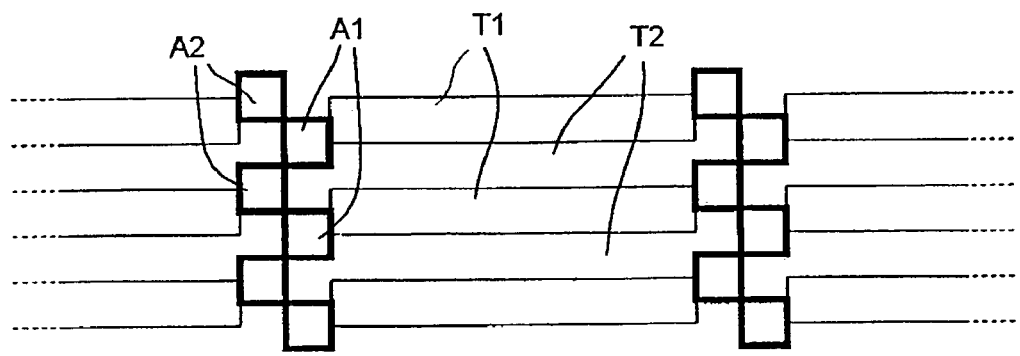

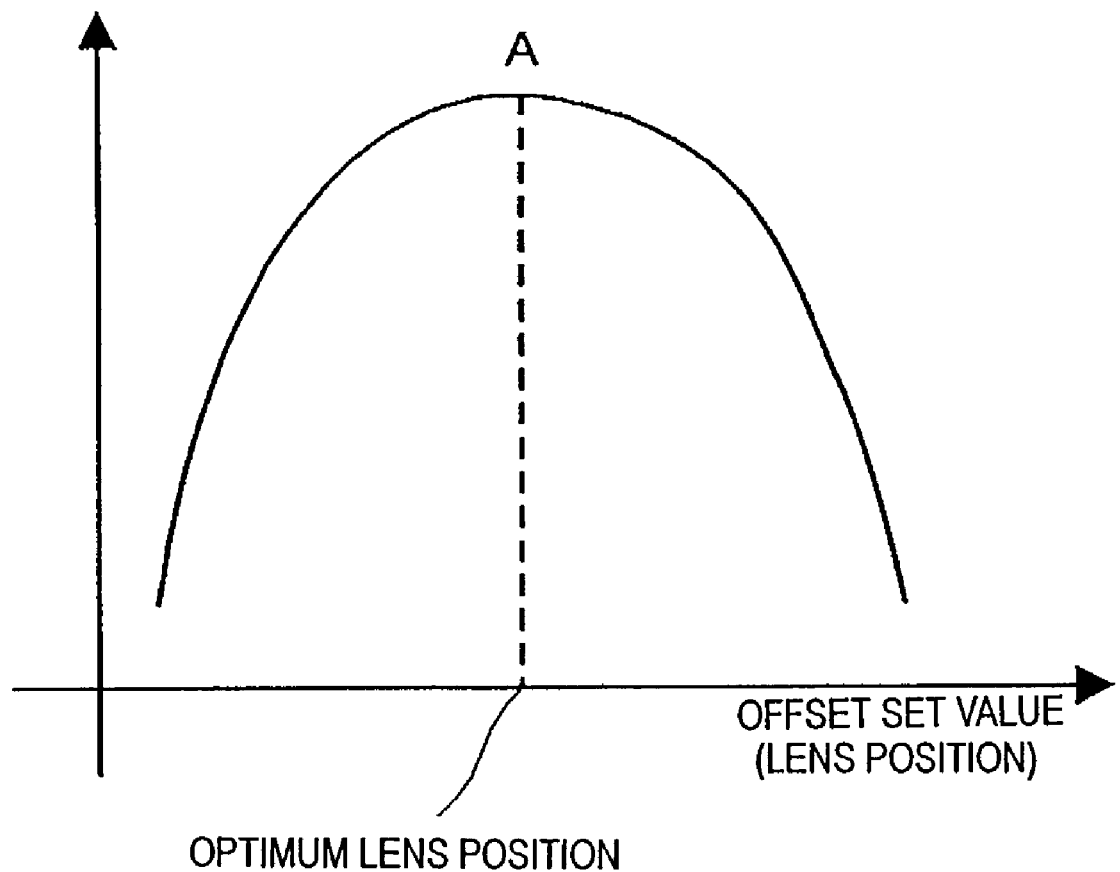

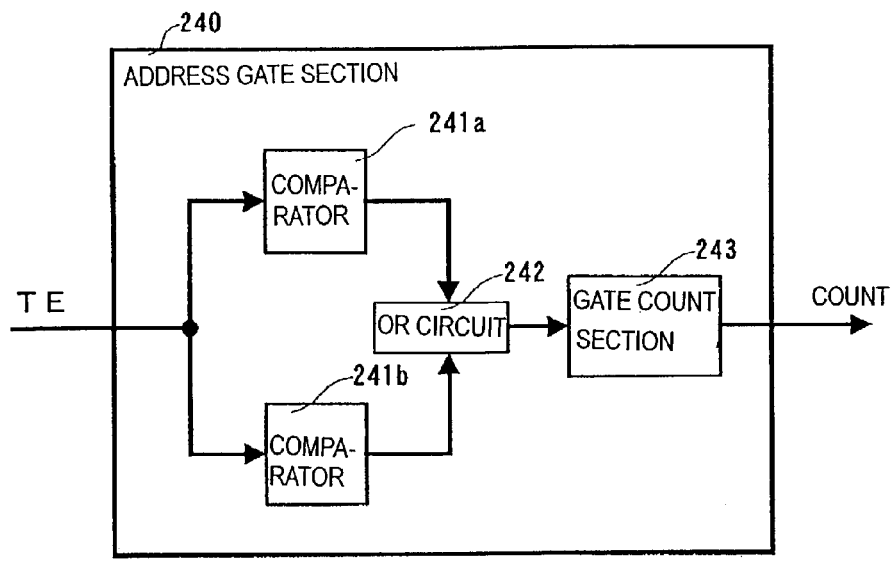
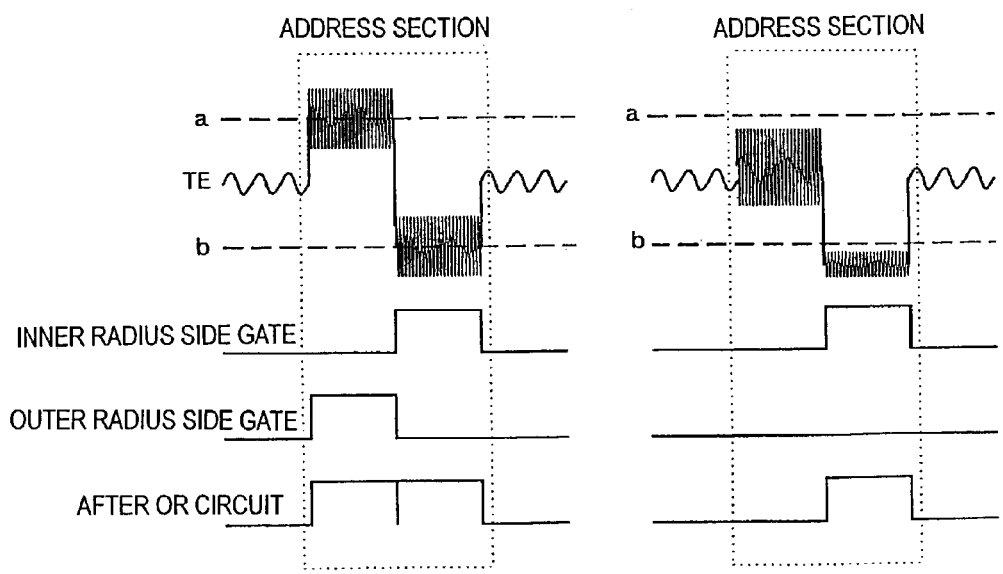

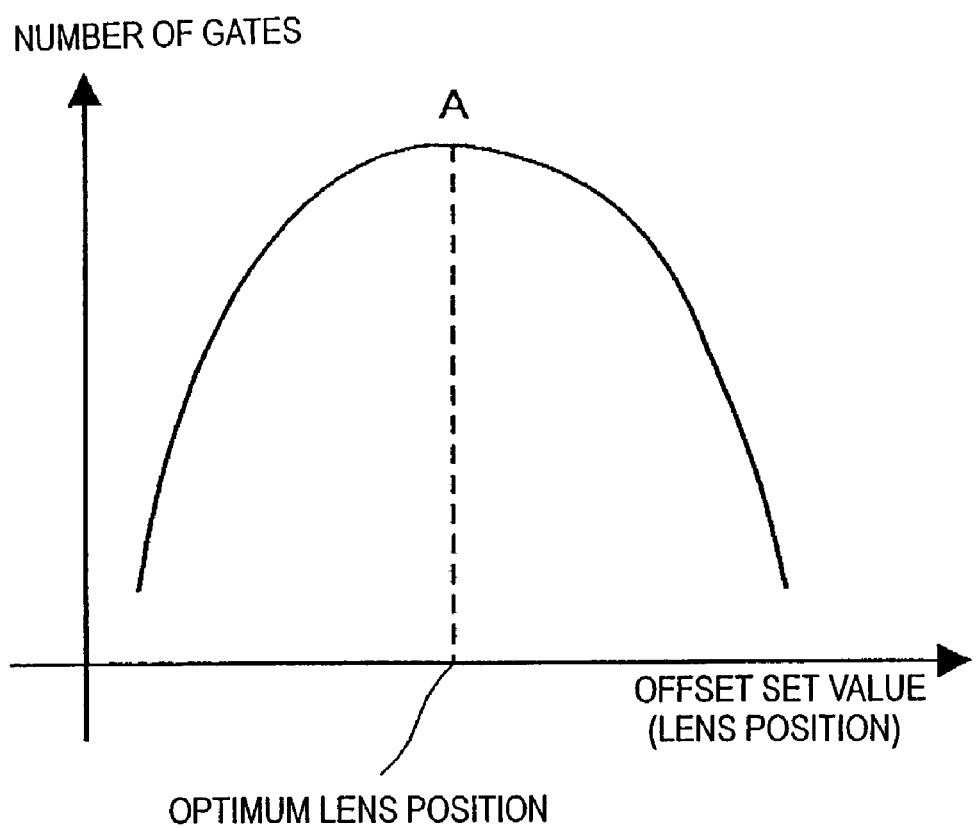

TE SIGNAL

TE SIGNAL

TE SIGNAL

CONTROL APPARATUS AND OPTICAL DISK APPARATUS

BACKGROUND OF THE INVENTION

1. Field of the Invention

The present invention relates to an optical recording/reproduction apparatus that optically records information on an information storage medium using a light source such as a laser and converts the information recorded on the information storage medium to a signal and reproduces it, or to an optical disk apparatus such as an optical reproduction apparatus that converts information pre-recorded on an information storage medium to a signal and reproduces it, and more particularly, to a control apparatus and an optical disk apparatus for performing control so that optical beam spots scan tracks correctly.

2. Description of the Related Art

As an example of a tracking control apparatus of a conventional optical disk apparatus, one that corrects lens shift so that an offset of a phase difference tracking error signal becomes zero is known.

FIG. 28 is a block diagram schematically showing a configuration of a conventional optical disk apparatus disclosed in Japanese Patent Publication No. 2000-315327. In the optical disk apparatus shown in FIG. 28, an optical pickup 20 is provided with a laser light-emitting element (not shown), a converging lens 22 and an actuator 23, and converges and irradiates an optical beam 21 onto an optical disk 10. The optical pickup 20 is further provided with an optical detector 24 which is divided into four detection sections A to D and the optical detector 24 detects a reflected beam 21' reflected by an information recording plane of the optical disk 10. The outputs of the detection sections A to D of the optical detector 24 are input to a signal generation circuit 30.

The signal generation circuit 30 is provided with a phase difference adjusting circuits 31a and 31b and adjusts a phase difference (referred to as a "tangential phase difference") in the circumferential (tangential) direction of the disk with respect to the output signals of the detection sections A and B input from the optical detector 24. This makes it possible to remove an offset caused by a phase difference produced between the outputs of the detection, sections A to D. Addition circuits 32a and 32b generate an addition signal (A+D) and an addition signal (B+C) resulting from adding up the outputs of the detection sections positioned at opposite angles of the optical detector 24 and a phase difference detection circuit 33 detects these phase differences. The output of the phase difference detection circuit 33 which is output through an LPF 34 becomes a phase difference tracking error signal (referred to as "DPDTE").

A digital signal processor (referred to as "DSP") 50 includes an offset adjusting section 52, a tracking control section 53, an offset measuring section 61, a lens shift correction section 62, an A/D converter 51 and a D/A converter 54.

The A/D converter 51 converts the DPDTE to a digital signal. The offset adjusting section 52 adds an offset for tracking control to a digital signal of the DPDTE. Furthermore, the tracking control section 53 generates a tracking drive value by carrying out a filter calculation for phase compensation and low-frequency compensation on the DPDTE digital signal. The tracking drive value generated is converted to an analog signal by the D/A converter 54 again and output to a drive circuit 91 as a tracking drive signal. The drive circuit 91 carries out current amplification on the tracking drive signal, drives an actuator 23 with a built-in optical pickup and carries out tracking control.

Then, a method of correcting lens shifts according to a conventional technology will be explained. With the optical pickup 20, the center of the converging lens 22 may shift from a set position due to mounting errors of optical parts including the converging lens 22 and optical detector 24, drooping of the converging lens caused by holding the apparatus in a vertical position or deviation of optical axis of a beam emitted from a laser. In this case, the reflected beam forms an image deviated from the center of the optical detector 24. In the following explanation, this state is referred to as a "lens shift." This lens shift is a shift of the position of the converging lens 22 or optical axis from the center of the optical detector 24 generated inside the optical pickup.

FIG. 29A to 29C show phase difference tracking error signals output from the optical pickup in various lens shift conditions when no tracking control is performed. A tangential phase difference caused by a lens shift is observed in the signals shown in FIG. 29A and 29C. More specifically, the signals shown in FIG. 29A and 29C are generated when the converging lens shifts from the center of a track toward the inner radius side and the outer radius side of the disk by about 300 μm. On the other hand, the signal shown in FIG. 29B is obtained when there is no shift in the converging lens.

When there is a tangential phase difference due to a lens shift as shown in FIG. 29A and 29C, if the converging lens is shifted through tracking control, the symmetry of a phase difference tracking error signal deteriorates and an offset is generated. A relationship between this DPDTE offset and lens shift is shown in FIG. 30. In FIG. 30, the horizontal axis shows the position of the converging lens and the vertical axis shows an offset value of the DPDTE.

As shown in FIG. 30, the position of the converging lens and offset value of the DPDTE show a linear relationship near an optimum lens position. By detecting this DPDTE offset and applying an offset to the tracking drive value so that the DPDTE offset becomes 0, it is possible to shift the position of the converging lens 22 and correct the lens shift.

Then, with reference to FIG. 28, a procedure for correcting a lens shift will be explained. The adjustments of the phase difference adjusting circuits 31a and 31b of the signal generation circuit 30 are shifted to create a condition in which a tangential phase difference has occurred. If a lens shift has occurred, a DPDTE offset occurs, and therefore the DPDTE offset is measured using the offset measuring section 61.

The lens shift correction section 62 adds this offset to the output value of the tracking control section. The drive circuit 91 moves the converging lens 22 based on the output value of the tracking control section to which this offset is applied. Here, moving the converging lens 22 using the linear relationship shown in FIG. 30 so that the DPDTE offset detected by the offset measuring section 61 becomes zero makes it possible to reduce the lens shift to zero.

For example, as in the case of a DVD-RAM disk, when addresses shifted toward the inner radius and outer radius by ½ track each with respect to a track are reproduced, if a lens shift occurs due to eccentricity or deviation of the optical axis, etc., balances of RF signals at the address section are lost. This prevents a gate signal for detecting and separating the address section from being generated or reduces the amplitude of the RF signal at the address section, deteriorates a signal to noise (S/N) ratio and thereby produces a problem of failing to reproduce address information correctly.

Solving this problem using the lens shift correction method in the above-described conventional optical disk apparatus requires a mechanism (detector) and an adjusting circuit for adjusting the tangential phase difference as shown in the signal generation circuit in FIG. 28. For this reason, there are problems that it is difficult to reduce the cost of the optical disk apparatus or reduce the size of the optical pickup.

The present invention has been implemented in view of the above-described problems and it is an object of the present invention to provide a tracking control apparatus and optical disk apparatus capable of reducing a lens shift to zero even for an apparatus which uses no phase difference tracking error signal and includes no phase difference adjusting circuit or an optical pickup simply divided into optical detectors.

SUMMARY OF THE INVENTION

A preferred embodiment of the present invention provides a tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for detecting reflected light of the optical beam obtained from the information storage medium and a moving part for moving the converging part across the information track. The tracking control apparatus comprises: an address reading part for acquiring addresses recorded on the information storage medium through the output of the optical detecting part; a first address reading deciding part for deciding that the address reading part has acquired the first address; a second address reading deciding part for deciding that the address reading part has acquired the second address; a lens position characteristic measuring part for successively generating offset set values so that the position of the converging part is moved by the moving part at predetermined spatial intervals and counting the number of times the decision results of both the first address reading deciding part and the second address reading deciding part show that the addresses have been acquired; and a lens shift adjusting part for searching for a maximum value of the acquisition count and moving the converging part using the moving part based on the offset set value when the acquisition count reaches a maximum value.

Another preferred embodiment of the present invention provides a tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control apparatus comprises: a difference signal generating part for generating a difference signal of each detected signal divided and detected by the optical detecting part; a first gate generating part for comparing the output of the difference signal generating part with a predetermined first level and generating a gate; a second gate generating part for comparing the output of the difference signal generating part with a predetermined second level and generating a gate; a lens position characteristic measuring part for successively generating offset set values for moving the position of the converging part using the moving part at predetermined spatial intervals and determining a measuring count based on the number of gates generated by the first gate generating part and the number of gates generated by the second gate generating part at respective positions to which the converging part has been moved; and a lens shift adjusting part for searching for the measuring count when a position shift of the converging part with respect to the optical detecting part reaches a minimum and moving the converging part using the moving part based on the offset set value corresponding to the searched measuring count.

In this particular preferred embodiment, the measuring count is a sum of the number of gates generated by the first gate generating part and the number of gates generated by the second gate generating part and the measuring count when a position shift of the converging part with respect to the optical detecting part reaches a minimum is a maximum value of the sum of the number of gates. Alternatively, the measuring count is a difference between the number of gates generated by the first gate generating part and the number of gates generated by the second gate generating part and the measuring count when a position shift of the converging part with respect to the optical detecting part reaches a minimum is zero or a value closest to zero.

Still another preferred embodiment of the present invention provides a tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control apparatus comprises: a difference signal generating part for generating a difference signal of each detected signal divided and detected by the optical detecting part; a peak detecting part for detecting a maximum value of the output of the difference signal generating part; a bottom detecting part for detecting a minimum value of the output of the difference signal generating part; a lens position characteristic measuring part for successively generating offset set values for moving the position of the converging part using the moving part at predetermined spatial intervals and obtaining a calculation value based on the detected value of the peak detecting part and the detected value of the bottom detecting part at respective positions to which the converging part has been moved; and a lens shift adjusting part for searching for the calculation value when a position shift of the converging part with respect to the optical detecting part reaches a minimum and moving the converging part using the moving part based on the offset set value corresponding to the searched calculation value.

In this particular preferred embodiment, when the detected value of the peak detecting part and the detected value of the bottom detecting part are expressed as TEmax and TEmin, respectively, the calculation value is (TEmax+TEmin)/(TEmax−TEmin) and the calculation value when a position shift of the converging part with respect to the optical detecting part reaches a minimum is zero or a value closest to zero.

Still another preferred embodiment of the present invention provides a tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control apparatus comprises: a difference signal generating part for generating a difference signal of each detected signal divided and detected by the optical detecting part; a first address amplitude detecting part for detecting an amplitude of the first address section from the output of the difference signal generating part; a second address amplitude detecting part for detecting an amplitude of the second address section from the output of the difference signal generating part; a lens position characteristic measuring part for successively generating offset set values for moving the position of the converging part using the moving part at predetermined spatial intervals and calculating a difference between the output of the first address amplitude detecting part and the output of the second address amplitude detecting part at their respective positions to which the converging part has been moved; and a lens shift adjusting part for searching for the output difference which is zero or a value closest to zero and moving the converging part using the moving part based on the offset set value when the output difference becomes zero or reaches a maximum value closest to zero.

Still another preferred embodiment of the present invention provides a tracking control apparatus for controlling an optical head comprising a converging part for converging and irradiating an optical beam onto an information storage medium having a first areas and a second area exhibiting different reflection characteristics when an optical beam is irradiated to perform optical recording and/or reproduction on the information storage medium, an optical detecting part for dividing and detecting reflected light of the optical beam obtained from the information storage medium and a moving part for moving the converging part across the information track. The tracking control apparatus comprises: a difference signal generating part for generating a difference signal of each detected signal divided and detected by the optical detecting part; an offset measuring part for measuring an average value during a predetermined period of the difference signal; a lens position characteristic measuring part for successively generating offset set values for moving the position of the converging part using the moving part at predetermined spatial intervals and calculating the average value at their respective positions to which the converging part has been moved for the first area and second area of the information storage medium; and a lens shift adjusting part for searching for the average value when the position shift of the converging part with respect to the optical detecting part reaches a minimum from a relationship between the offset set value obtained in the first area of the information storage medium and the average value and a relationship between the offset set value obtained in the second area and the average value and moving the converging part using the moving part based on the offset set value corresponding to the searched average value.

In one preferred embodiments, the lens position characteristic measuring part acquires the acquisition count, the measuring count, the calculated value, the output difference or the average value when the information storage medium is turned once or an integer multiple of times.

In one preferred embodiments, the tracking control apparatus, further comprises: a tracking error signal generating part for detecting a track shift from the output of the optical detecting part; and an offset adjusting part for adjusting an offset of the tracking error signal generating part, wherein the lens position characteristic measuring part is operated after the offset adjusting part carries out offset adjustment.

In one preferred embodiments, the tracking control apparatus, further comprises: a tracking error signal generating part for detecting a track shift from the output of the optical detecting part; and an offset adjusting part for adjusting an offset of the tracking error signal generating part, wherein the lens position characteristic measuring part is operated before the offset adjusting part carries out offset adjustment.

In one preferred embodiments, the tracking control apparatus, further comprises: a tracking error signal generating part for detecting a track shift from the output of the optical detecting part; and an offset adjusting part for adjusting an offset of the tracking error signal generating part, wherein the offset adjusting part is operated according to the amount of movement of the converging part using the moving part.

In one preferred embodiments, the information storage medium includes an information track formed of projections and depressions, the lens position characteristic measuring part measures the projections and depressions of the information track and the lens shift adjusting part moves the converging part to the projections and depressions based on the measurement result.

In one preferred embodiments, the lens position characteristic measuring part and a lens shift adjusting part are operated according to the position of the information storage medium.

In one preferred embodiments, the lens shift adjusting part includes an approximated function deciding part for deciding an approximated function from a relationship between the acquisition count, the measuring count, the calculated value, the output difference or the average value and the offset set value and determining the offset set value when the position shift of the converging part with respect to the optical detecting part reaches a minimum from the approximated function.

In one preferred embodiments, the lens shift adjusting part determines a range where the acquisition count, the measuring count, the calculated value, the output difference or the average value becomes almost constant and regards the offset set value corresponding to the center of the range where the value becomes constant as the offset set value when the position shift with respect to the optical detecting part reaches a minimum.

In one preferred embodiments, the lens position characteristic measuring part acquires the acquisition count, the measuring count, the calculated value, the output difference or the average value according to the rotation phase of the information storage medium.

In one preferred embodiments, the lens shift adjusting part decides the offset set value according to the rotation phase of the information storage medium.

In one preferred embodiments, the first gate generating part and the second gate generating part detect addresses using a level different from the first level and second level.

In one preferred embodiments, the first address amplitude detecting part and the second address amplitude detecting part detect the amplitude at predetermined locations where the amplitude becomes almost constant at the first address section and second address section of the information storage medium.

In one preferred embodiments, the lens shift adjusting part obtains a first function indicating a relationship between the offset set value obtained in the first area of the information storage medium and the average value and a second function indicating a relationship between the offset set value obtained in the second area and the average value and moves the converging part using the moving part based on the offset set value calculated from a point of intersection between the first function and second function.

Still another preferred embodiment of the present invention provides an optical disk apparatus comprising: an optical head comprising a converging part for converging and irradiating an optical beam onto an information storage medium, an optical detecting part for detecting reflected light of the optical beam obtained from the information storage medium and a moving part for moving the converging part across the information track; and one of the tracking control apparatuses mentioned above.

Still another preferred embodiment of the present invention provides a tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for detecting reflected light of the optical beam obtained from the information storage medium and a moving part for moving the converging part across the information track. The tracking control method comprises the step of: successively generating offset set values so that the position of the converging part is moved by the moving part at predetermined spatial intervals and counting the number of times the first address and the second address have been acquired at respective positions to which the converging part has been moved; and searching for a maximum value of the acquisition count and moving the converging part using the moving part based on the offset set value when the acquisition count reaches a maximum value.

Still another preferred embodiment of the present invention provides a tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control method comprises the steps of: generating a difference signal of each detected signal divided and detected by the optical detecting part; comparing the difference signal with a first level and a second level and generating a first gate and a second gate when the difference signal exceeds the first level and the second level; successively generating offset set values for moving the position of the converging part using the moving part at predetermined spatial intervals and determining a measuring count based on the generated first gate and the generated second gate at respective positions to which the converging part has been moved; and searching for the measuring count when a position shift of the converging part with respect to the optical detecting part reaches a minimum and moving the converging part using the moving part based on the offset set value corresponding to the searched measuring count.

In this particular preferred embodiments, the measuring count is a sum of the number of the first gate and the number of the second gate and the measuring count when a position shift of the converging part with respect to the optical detecting part reaches a minimum is a maximum value of the sum of the number of gates. Alternatively, the measuring count is a difference between the number of the first gate and the number of the second gate and the measuring count when a position shift of the converging part with respect to the optical detecting part reaches a minimum is zero or a value closest to zero.

Still another preferred embodiment of the present invention provides a tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control method comprises the steps of: generating a difference signal of each detected signal divided and detected by the optical detecting part; detecting a maximum value and a minimum value of the difference signal; successively generating offset set values for moving the position of the converging part using the moving part at predetermined spatial intervals and obtaining a calculation value based on the maximum value and the minimum value; and searching for the calculation value when a position shift of the converging part with respect to the optical detecting part reaches a minimum and moving the converging part using the moving part based on the offset set value corresponding to the searched calculation value.

In this particular preferred embodiment, when the detected value of the peak detecting part and the detected value of the bottom detecting part are expressed as TEmax and TEmin, respectively, the calculation value is (TEmax+TEmin)/(TEmax−TEmin) and the calculation value when a position shift of the converging part with respect to the optical detecting part reaches a minimum is zero or a value closest to zero.

Still another preferred embodiment of the present invention provides a tracking control method for controlling an optical head which compares a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track. The tracking control method comprises the steps of: generating a difference signal of each detected signal divided and detected by the optical detecting part; detecting an amplitude of the difference signal at the first address section and an amplitude of the difference signal at the second address section; successively generating offset set values for moving the position of the converging part using the moving part at predetermined spatial intervals and calculating a difference between the amplitude at first address section and the amplitude at the second address section, at their respective positions to which the converging part has been moved; and searching for the output difference which is zero or a value closest to zero and moving the converging part using the moving part based on the offset set value when the output difference becomes zero or reaches a maximum value closest to zero.

Still another preferred embodiment of the present invention provides a tracking control method for controlling an optical head which comprises a converging part for converging and irradiating an optical beam onto an information storage medium having a first areas and a second area exhibiting different reflection characteristics when an optical beam is irradiated to perform optical recording and/or reproduction on the information storage medium, an optical detecting part for dividing and detecting reflected light of the optical beam obtained from the information storage medium and a moving part for moving the converging part across the information track. The tracking control method comprises the steps of: generating a difference signal of each detected signal divided and detected by the optical detecting part; measuring an average value of the difference signal during a predetermined period; successively generating offset set values for moving the position of the converging part using the moving part at predetermined spatial intervals and calculating the average value at their respective positions to which the converging part has been moved for the first area and second area of the information storage medium; and searching for the average value when the position shift of the converging part with respect to the optical detecting part reaches a minimum from a relationship between the offset set value obtained in the first area of the information storage medium and the average value and a relationship between the offset set value obtained in the second area and the average value and moving the converging part using the moving part based on the offset set value corresponding to the searched average value.

In this particular preferred embodiment, the searching step comprises the step of: obtaining a first function indicating a relationship between the offset set value obtained in the first area of the information storage medium and the average value and a second function indicating a relationship between the offset set value obtained in the second area and the average value; and moving the converging part using the moving part based on the offset set value calculated from a point of intersection between the first function and second function.

Still another preferred embodiment of the present invention provides a computer program for performing each step recited in the method according one of the above-mentioned methods.

Still another preferred embodiment of the present invention provides a computer readable storage medium storing the program.

BRIEF DESCRIPTION OF THE DRAWINGS

FIG. 2 is a block diagram showing a configuration of the signal processing section shown in FIG. 1.

FIG. 3 illustrates a structure of an optical disk.

FIG. 5 illustrates a relationship between the number of address OK signals and an offset set value.

FIG. 7 is a block diagram showing a configuration of the address gate section shown in FIG. 6.

FIG. 8A and 8B illustrate a waveform of an RF difference signal input to the address gate section.

FIG. 9 illustrates a relationship between a gate count and an offset set value.

DETAILED DESCRIPTION OF PREFERRED EMBODIMENTS

First Embodiment

Figure 1:
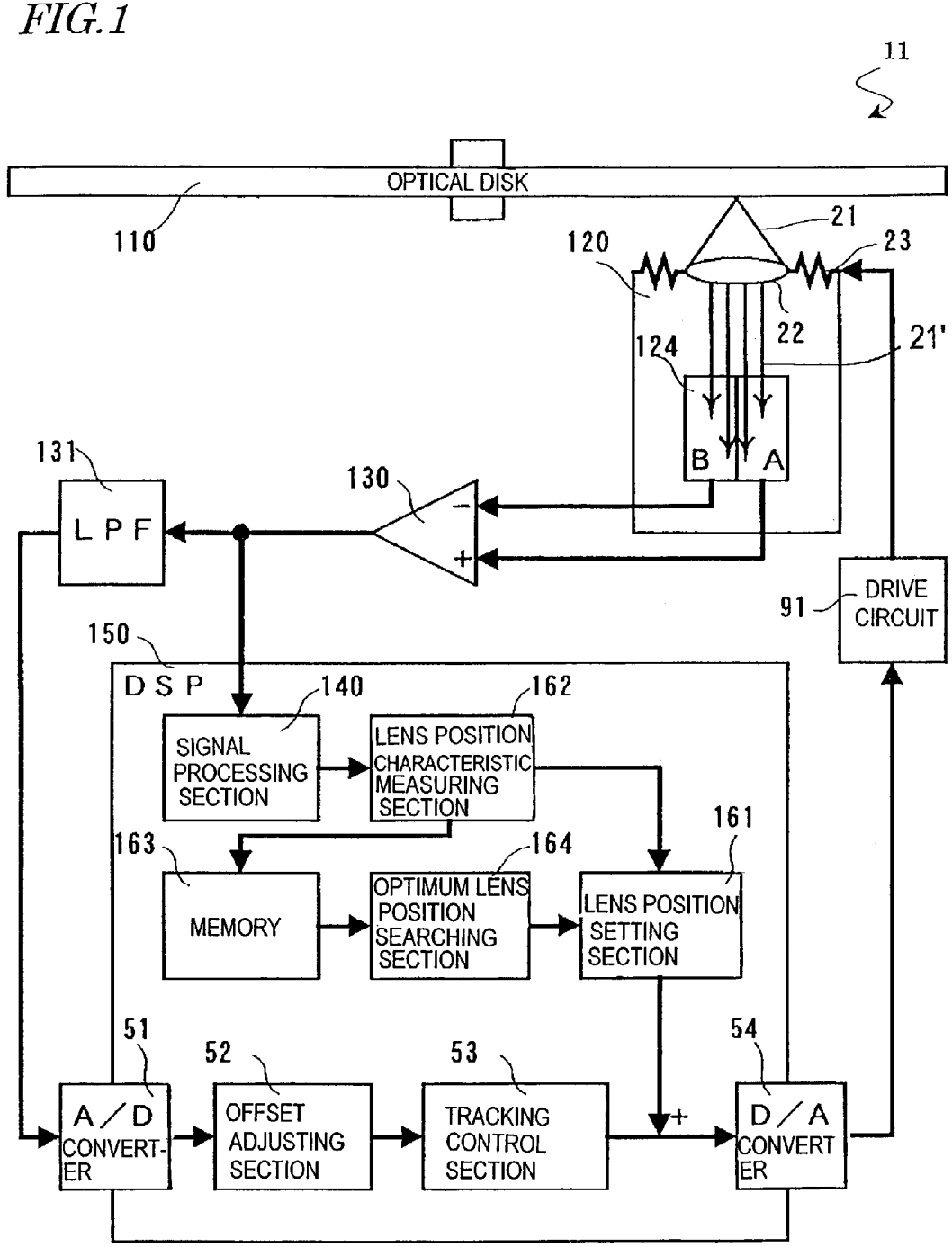
FIG. 1 is a block diagram showing a first embodiment of an optical disk apparatus of the present invention.

FIG. 1 is a block diagram showing a configuration of a tracking control apparatus and an optical disk apparatus using this tracking control apparatus according to a first embodiment. In the optical disk apparatus 11, an optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium. The optical disk 110 includes address portions which includes addresses shifted by approximately ½ track with respect to an information track, for example. The actuator 23 makes the converging lens 22 move so as to cross the information track.

The optical pickup 120 is further provided with an optical detector 124 which includes detection sections A and B divided in a radial direction of the optical disk. The optical detector 124 which is an optical detecting part detects a reflected beam 21' reflected by an information recording plane of the optical disk 110. The outputs of the detection sections A and B of the optical detector 124 are input to a subtraction circuit 130 which generates a signal obtained by subtracting a signal B corresponding to the quantity of light detected by the detection section B from a signal A corresponding to the quantity of light detected by the detection section A, that is, an RF difference signal of (A−B). The RF difference signal passes through a low pass filter (LPF) 131 and is input to a digital signal processor (DSP) 150 which is a tracking control apparatus as a tracking error signal (hereinafter referred to as "TE").

The DSP 150 includes a signal processing section 140, a lens position characteristic measuring section 162, a memory 163, an optimum lens position searching section 164, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset in tracking control to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 150 can add an offset to the tracking drive value which is the output of the tracking control section 53 and shift the position of the converging lens 22 relative to the position of the optical detector 124.

Furthermore, an RF difference signal is input from the subtraction circuit 130 to the signal processing section 140 of the DSP 150. It is possible to obtain address information from this signal processing section 140. FIG. 2 is a block diagram showing a more specific configuration of the signal processing section 140. In the signal processing section 140, a high pass filter (HPF) 141 removes the DC part from the RF difference signal. The RF difference signal stripped of the DC part is converted to data binarized at an appropriate slice level by a binarization circuit 142. The binarized data signal is input to a PLL circuit 143 where the frequency and phase of a synchronous clock signal for data extraction are controlled based on the binarized data signal. The output of the PLL circuit 143 is input to a decoder 144 which is an address reading part and the decoder 144 outputs reproduction information, that is, code data of a track or sector address.

An address read decision section 145 which is a first address read decision part and a second address read decision part decides whether the address has been read correctly or not based on the output result of the decoder 144. When the address read decision section 145 decides that the address has been read correctly, it outputs an address OK signal to the lens position characteristic measuring section 162 which indicates that the address has been read correctly as shown in FIG. 1.

The lens position characteristic measuring section 162, which is a lens position characteristic measuring part outputs an offset set value to the lens position setting section 161 so that the lens position setting section 161 generates offsets for moving the position of the converging lens 22 one after another at predetermined intervals and at the same time counts the number of address OK signals received at that offset set value. It is to be noted that the predetermined intervals are not necessarily the same with each other. Then, the lens position characteristic measuring section 162 outputs the offset set value and the number of address OK signals at that time to the memory 163. The memory 163 stores the offset set value and the number of address OK signals successively. Based on the offset set value received from the lens position characteristic measuring section 162, the lens position setting section 161 generates offsets successively and adds the offsets to the tracking drive value which is the output of the tracking control section 53.

The optimum lens position searching section 164 which is a lens shift adjusting part calculates a maximum value of the number of address OK signals as will be detailed below, sets the offset set value at that time as the offset set value that gives an optimum lens position and outputs it to the lens position setting section 161. The lens position setting section 161 generates offsets based on the offset set value that gives the optimum lens position and adds it to the tracking drive value. This allows a lens shift to be set to zero.

FIG. 3 is a schematic view to illustrate a physical structure of the optical disk 110 which is an information storage medium. In the optical disk 110, tracks T1 formed of protrusions and tracks T2 formed of depressions are placed on the information recording plane alternately. On the tracks 1 and T2, information such as user data, etc., is recorded using a mark, etc. A first address section A1 is recorded at a position shifted from track T1 by approximately ½ track toward the inner radius of the disk and a second address A2 is recorded at a position shifted from track T1 by approximately ½ track toward the outer radius of the disk.

Figure 4A:
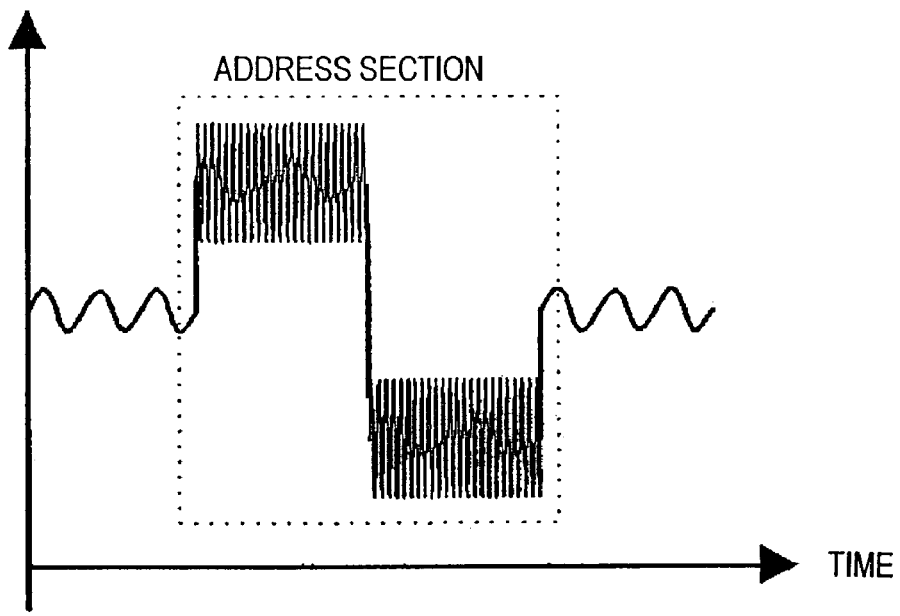
FIG. 4A and FIG. 4B illustrate examples of an output waveform of an RF difference signal when the address section of the optical disk shown in FIG. 3 is reproduced.
Figure 4B:
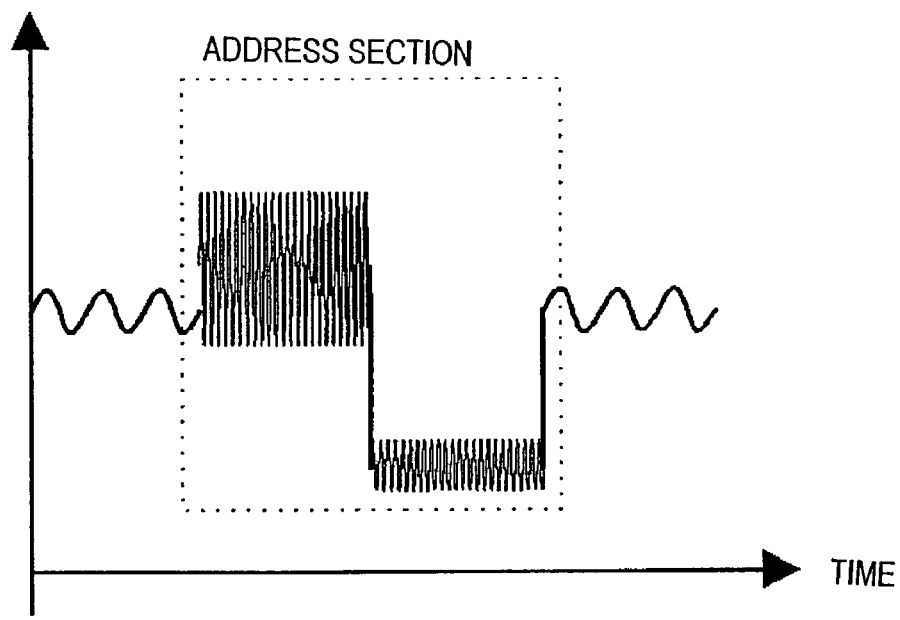

FIG. 4 is an example of an output waveform of an RF difference signal when the address sections of the optical disk 110 shown in FIG. 3 are reproduced. FIG. 4A shows a waveform when there is no lens shift and FIG. 4B shows a waveform when there is a lens shift toward the inner radius. When there is a lens shift toward the inner radius as shown in FIG. 4B, the waveforms at the two address sections are asymmetrical and the address section on the outer radius side cannot obtain a sufficient RF signal amplitude, unable to reproduce addresses. When no error occurs during the reproduction of both the first address section A1 and second address section A2, the address read decision section 145 shown in FIG. 2 decides that addresses have been read successfully, generates an address OK signal and outputs it to the lens position characteristic measuring section 162. As is apparent from FIG. 4, when a lens shift has occurred, address OK signals are output less frequently. Therefore, it is possible to detect a lens shift taking advantage of the fact that the number of address OK signals counted by the lens position characteristic measuring section 162 is greater when there is a small lens shift than when there is a large lens shift.

FIG. 5 shows a relationship between the offset set value set by the lens position characteristic measuring section 162 and the number of address OK signals. In FIG. 5, the horizontal axis shows an offset set value and the vertical axis shows the number of address OK signals. Since the lens position setting section 161 generates an offset based on the offset set value and a tracking drive value is added, the horizontal axis also shows a relative lens position. In the characteristic shown in FIG. 5, point A at which the address OK signal reaches a maximum is an optimum lens position with no lens shift. The optimum lens position searching section 164 calculates a maximum value of the number of address OK signals stored in the memory 163 and outputs the offset set value at that time to the lens position setting section 161 as the optimum lens position. The lens position setting section 161 generates an offset based on the offset set value received and superimposes the offset on the tracking drive value. The tracking drive signal with an offset added is output from the drive circuit 91, which corrects the lens shift and allows the RF difference signal at the address sections to always become a waveform with good symmetry as shown in FIG. 4A. That is, it is possible to obtain a good tracking signal and RF signal and provide a highly reliable optical disk apparatus.

Figure 28:
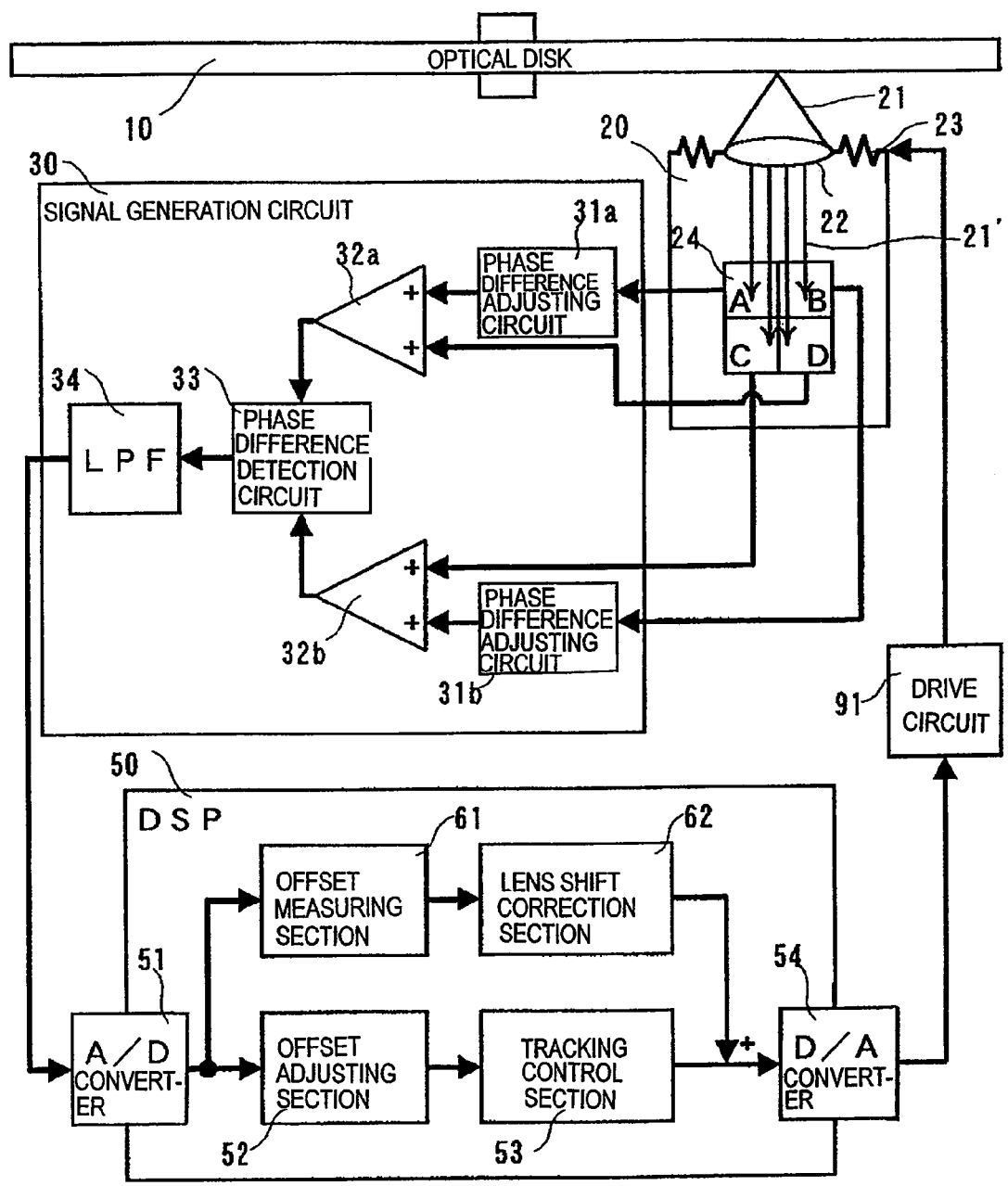
FIG. 28 is a block diagram showing a configuration of a conventional optical disk apparatus.
Figure 29A:
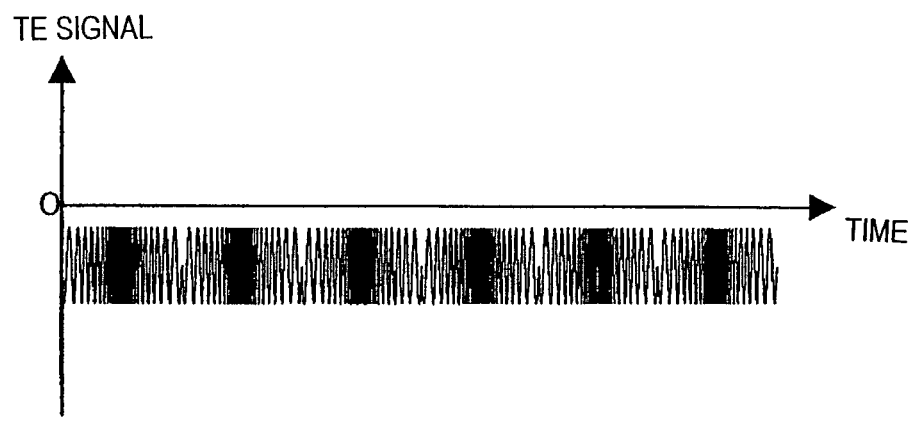
FIG. 29A to FIG. 29C illustrate a waveform of a phase difference tracking error signal.
Figure 29B:
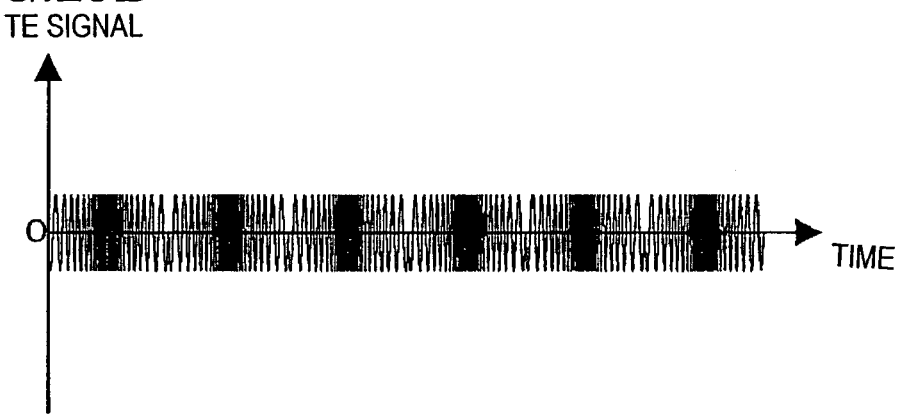
Figure 29C:
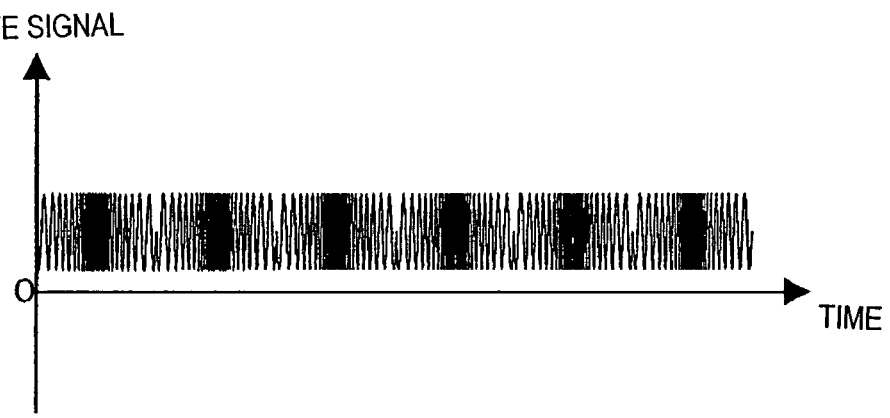
Figure 30:
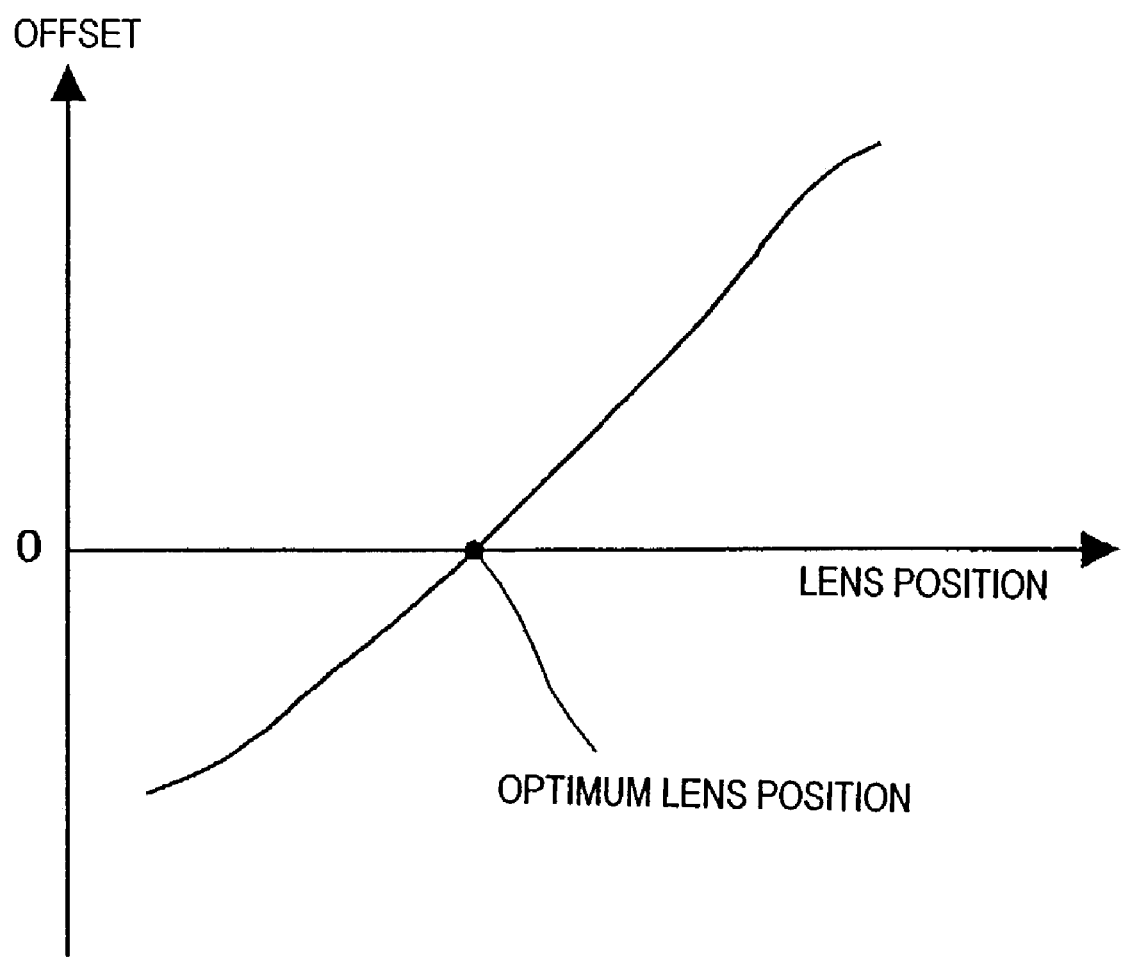
FIG. 30 illustrates a lens shift characteristic of a phase difference tracking error signal.

In this embodiment, the optical detector 124 is provided with a detection area divided into two parts. However, similar effects can be obtained by carrying out processing using the optical detector 24 divided into four parts of the conventional example as shown in FIG. 28 and using a signal with the outputs of the detection section A and detection section C added and a signal with the outputs of the detection section B and detection section D added.

As is explained above, according to the present invention, the lens shift of the converging lens with respect to the optical detector is adjusted based on the signal obtained by reading the first address and the second address of the information storage medium. More particularly, this preferred embodiment utilizes the fact that the lens shift is zero or minimum in the case where the both addresses can be reproduced correctly, as the first address and the second address are shifted from the information track toward the inner radius side and outer radius side by approximately ½ track, respectively.

Specifically, the position of the converging lens with respect to the optical detector is changed by successively generating the offset set values. Then, the number of the times the first address and the second address are correctly acquired is counted. The lens shift can be adjust to become zero or minimum by moving the converging lens using the offset set value which is given at the maximum counting number.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

Second Embodiment

Figure 6:
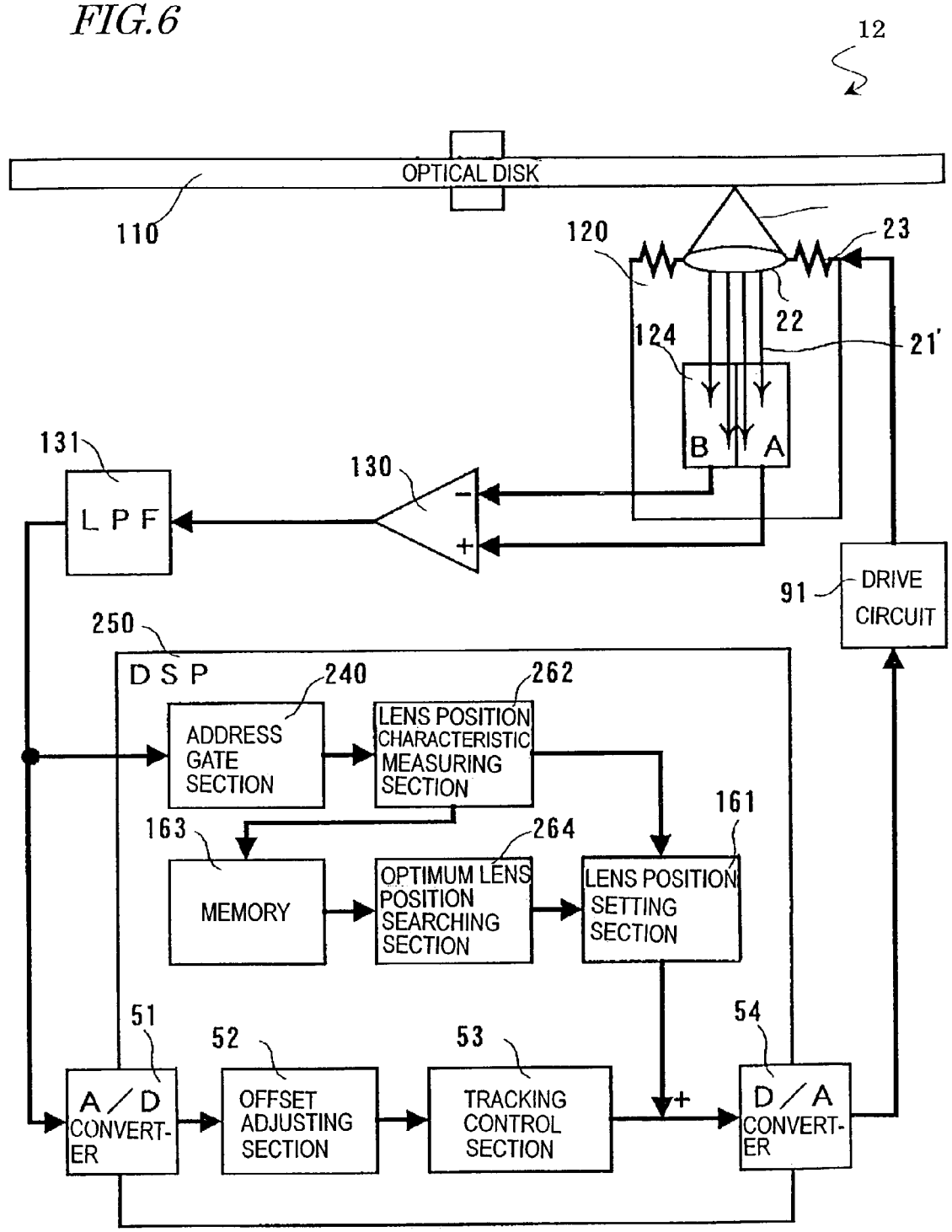
FIG. 6 is a block diagram showing a second embodiment of the optical disk apparatus of the present invention.

FIG. 6 is a block diagram showing a configuration of a tracking control apparatus according to this embodiment and an optical disk apparatus using this tracking control apparatus. In the optical disk apparatus 12, the same components as those of the optical disk apparatus 11 of the first embodiment are assigned the same reference numerals.

An optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium.

The optical pickup 120 is further provided with an optical detector 124 which includes detection sections A and B divided into a radial direction. The optical detector 124 which is an optical detecting part, detects a reflected beam 21' reflected by an information recording plane of the optical disk 110. The outputs of the detection sections A and B of the optical detector 124 are input to a subtraction circuit 130 which generates a signal obtained by subtracting a signal B corresponding to the quantity of light detected by the detection section B from a signal A corresponding to the quantity of light detected by the detection section A, that is, an RF difference signal of (A–B). The RF difference signal passes through a low pass filter (LPF) 131 and is input to a digital signal processor (DSP) 250 which is a tracking control apparatus as a tracking error signal (hereinafter referred to as "TE").

The DSP 250 includes an address gate section 240, a lens position characteristic measuring section 262, a memory 163, an optimum lens position searching section 264, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 250 can add an offset to the tracking drive value which is the output of the tracking control section 53 and shift the position of the converging lens 22 relative to the position of the optical detector 124.

Furthermore, the TE which is the output from the LPF 131 is input to the address gate section 240. The address gate section 240 generates a gate signal based on the TE and counts the number of gate signals.

FIG. 7 is a block diagram showing a more specific configuration of the address gate section 240. The address gate section 240 is provided with a comparator 241a which is a first gate generating part and a comparator 241b which is a first gate generating part. When the TE exceeds a predetermined level, the comparators 241a and 241b output output signals to an OR circuit 242. The OR circuit 242 generates an output signal when a signal is received from the comparator 241a or comparator 241b. A gate count section 243 which is a counting part counts the number of outputs from the OR circuit 242 and outputs the count to the lens position characteristic measuring section 262 which is a lens position characteristic measuring part.

The lens position characteristic measuring section 262 outputs an offset set value to the lens position setting section 161 so that the lens position setting section 161 generates offsets for moving the position of the converging lens 22 one after another at predetermined time intervals and predetermined spatial intervals and at the same time counts the count received from the address gate section 240 at the offset set value. It is to be noted that the predetermined intervals are not necessarily the same with each other. Then, the lens position characteristic measuring section 262 outputs the offset set value and the count at that time to the memory 163. The memory 163 stores offset set values and counts one after another. The lens position setting section 161 generates offsets one after another based on the offset set values received from the lens position characteristic measuring section 162 and adds the offset to the tracking drive value which is the output of the tracking control section 53.

As will be detailed below, the optimum lens position searching section 264 which is a lens shift adjusting part calculates a maximum value of the count and decides the offset set value at that time as the offset set value that gives an optimum lens position and outputs it to the lens position setting section 161. The lens position setting section 161 generates an offset based on the offset set value that gives the optimum lens position and adds it to the tracking drive value. This makes it possible to set the lens shift to zero.

FIG. 8A and FIG. 8B show waveforms of signals of various sections of the address gate section 240. As shown in FIG. 8A, when TE with no lens shift is input to the address gate section 240, the address section of the TE exceeds comparator levels a and b set in the comparators 241a and 241b, and therefore an outer radius gate signal and inner radius gate signal are output from the comparators 241a and 241b. In this case, the OR circuit 242 counts outer radius gate signals and inner radius gate signals and outputs 2 as a count.

On the other hand, as shown in FIG. 8B, when TE corresponding to a case where a lens shift has occurred on the inner radius side is input, the address section of the TE does not exceed a the comparator 241a. Thus, no outer radius gate signal is generated and only inner radius gate signals are generated from the comparator 241b. In this case, the OR circuit 242 outputs 1 as a count.

Though FIG. 8 only shows one address section, the lens position characteristic measuring section 262 sets time intervals for generating offset set values so that a plurality of address sections are received at a certain offset set value. Thus, when a lens shift has occurred, the count of gate signals generated also decreases.

FIG. 9 shows a relationship between the lens position and the count of gates generated based on the offset set value set by the lens position characteristic measuring section 262. In FIG. 9, the horizontal axis shows the position of the converging lens and the vertical axis shows the number of gates counted. Based on the offset set value, the lens position setting section 161 generates an offset and adds it to the tracking drive value, and therefore the horizontal axis also indicates a relative lens position. In the characteristic shown in FIG. 9, point A where the count reaches a maximum is an optimum lens position with no lens shift. The optimum lens position searching section 264 determines a maximum value of the count stored in the memory 163 and outputs the offset set value at that time to the lens position setting section 161 as the optimum lens position. The lens position setting section 161 generates an offset based on the offset set value received and superimposes the offset on the tracking drive value. The tracking drive signal with an offset added is output from the drive circuit 91, which corrects the lens shift and allows the RF difference signal at the address sections to always become a waveform with good symmetry as shown in FIG. 4A. That is, it is possible to obtain a good tracking signal and RF signal and provide a highly reliable optical disk apparatus.

As is explained above, according to the present invention, the lens shift of the converging lens with respect to the optical detector is adjusted based on the signal obtained by reading the first address and the second address of the information storage medium. More particularly, this preferred embodiment produces a difference signal which is obtained from signals detected by the divided detectors, compares the difference signal with the first and second levels and counts the number of times the difference signal exceeds the first and second levels. As the first address and the second address are shifted from the information track toward the inner radius side and outer radius side by approximately ½ track, respectively, the lens shift is zero or minimum when the sum of the number of times the difference signal exceeds the first level and the number of times the difference signal exceeds the second level becomes maximum.

Specifically, the position of the converging lens with respect to the optical detector is changed by successively generating the offset set values. Then, the sum of the number of times the difference signal exceeds the first level and the number of times the difference signal exceeds the second level is calculated at each position. The lens shift can be adjust to become zero or minimum by moving the converging lens using the offset set value which is given at the maximum counting number.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

Third Embodiment

Figure 10:
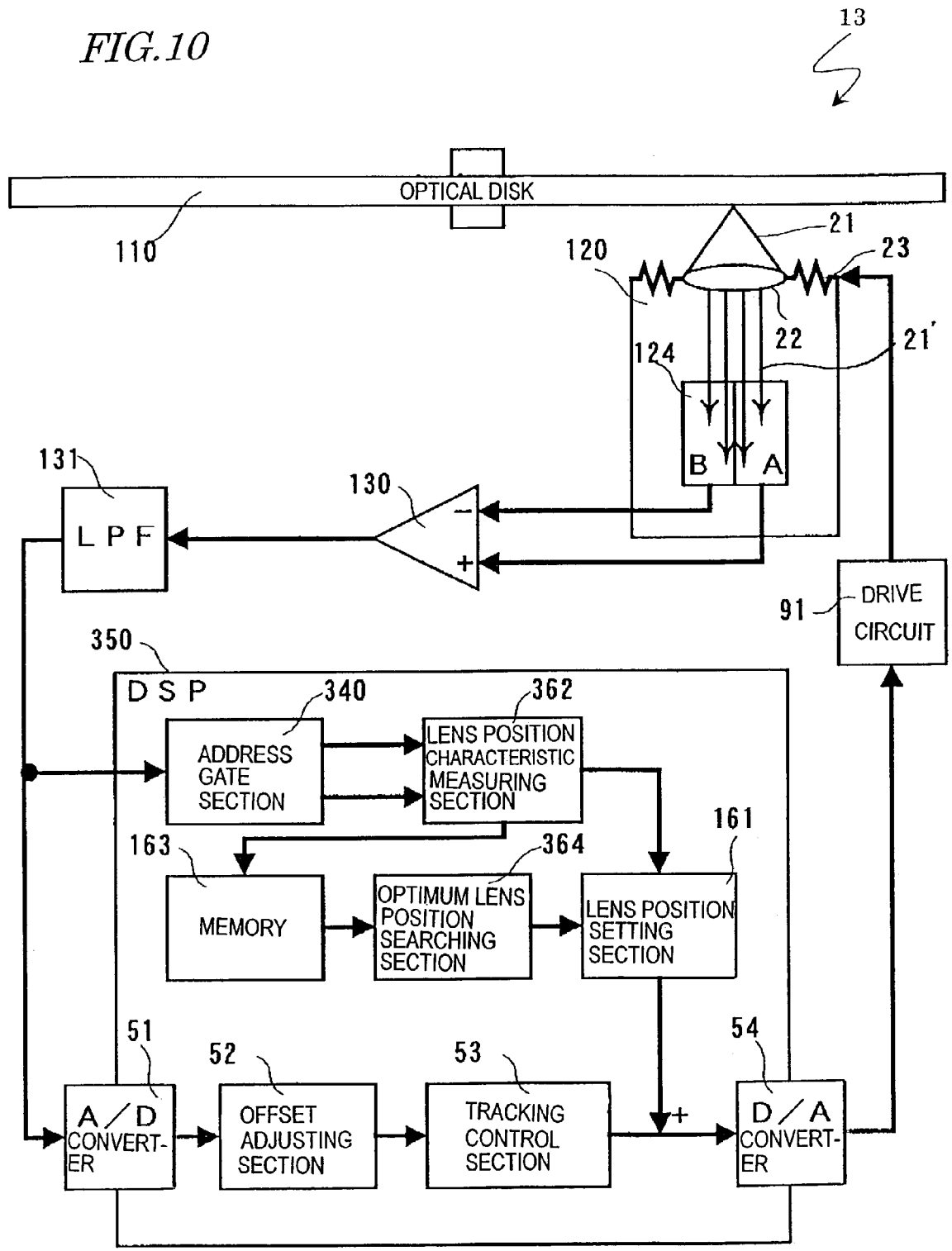
FIG. 10 is a block diagram showing a third embodiment of the optical disk apparatus of the present invention.

FIG. 10 is a block diagram showing a configuration of a tracking control apparatus according to this embodiment and an optical disk apparatus using this tracking control apparatus. In the optical disk apparatus 13, the same components as those of the optical disk apparatus 11 of the first embodiment are assigned the same reference numerals.

An optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium.

The optical pickup 120 is further provided with an optical detector 124 which includes detection sections A and B divided in a radial direction. The optical detector 124 which is an optical detecting part, detects a reflected beam 21' reflected by an information recording plane of the optical disk 110. The outputs of the detection sections A and B of the optical detector 124 are input to a subtraction circuit 130 which generates a signal obtained by subtracting a signal B corresponding to the quantity of light detected by the detection section B from a signal A corresponding to the quantity of light detected by the detection section A, that is, an RF difference signal of (A−B). The RF difference signal passes through a low pass filter (LPF) 131 and is input to a digital signal processor (DSP) 350 which is a tracking control apparatus as a tracking error signal (hereinafter referred to as "TE").

The DSP 350 includes an address gate section 340, a lens position characteristic measuring section 362, a memory 163, an optimum lens position searching section 364, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 350 can add an offset to the tracking drive value which is the output of the tracking control section 53 and shift the position of the converging lens 22 relative to the position of the optical detector 124.

Furthermore, the TE which is the output from the LPF 131 is input to the address gate section 340. The address gate section 340 generates a gate signal based on the TE and counts the number of gate signals.

Figure 11:
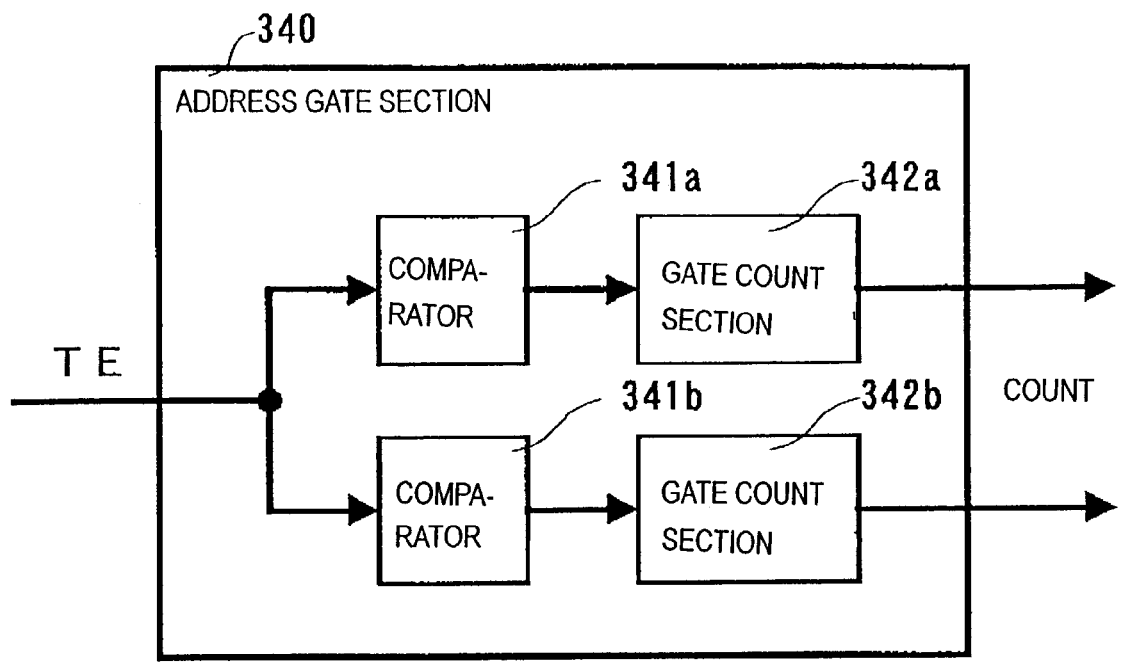
FIG. 11 is a block diagram showing a configuration of the address gate section shown in FIG. 10.

FIG. 11 is a block diagram showing a more specific configuration of the address gate section 340. The address gate section 340 is provided with a comparator 341a which is a first gate generating part, a comparator 341b which is a first gate generating part and gate count sections 342a and 342b which are counting parts.

The comparators 341a and 341b each receive TE and output a gate signal to the gate count sections 342a and 342b when the TE exceeds a predetermined comparator level. The gate count sections 342a and 342b count the number of gate signals and outputs the count to the lens position characteristic measuring section 362 which is a lens position characteristic measuring part.

The lens position characteristic measuring section 362 outputs an offset set value to the lens position setting section 161 so that the lens position setting section 161 generates offsets for moving the position of the converging lens 22 one after another at predetermined time intervals and predetermined spatial intervals and at the same time determines a difference between the counts received from the gate count sections 342a and 342b of the address gate section 340 at the offset set value. It is to be noted that the predetermined intervals are not necessarily the same with each other. Then, the lens position characteristic measuring section 362 outputs the offset set value and the difference between the counts at that time to the memory 163. The memory 163 stores offset set values and differences between the counts one after another. The lens position setting section 161 generates offsets one after another based on the offset set values received from the lens position characteristic measuring section 362 and adds the offset to the tracking drive value which is the output of the tracking control section 53.

As will be detailed below, the optimum lens position searching section 364 which is a lens shift adjusting part regards an offset set value when the difference between the counts becomes zero or a value closest to zero as an offset set value that gives an optimum lens position and outputs it to the lens position setting section 161. The lens position setting section 161 generates an offset based on the offset set value that gives the optimum lens position and adds it to the tracking drive value. This makes it possible to set the lens shift to zero.

As shown in FIG. 8A, when TE without any lens shift is input to the address gate section 340, the address section of the TE exceeds comparator levels a and b set in the comparators 341a and 341b, and therefore an outer radius gate signal and inner radius gate signal are output from the comparators 341a and 341b. In this case, the counts of gate signals output from both the gate count sections 342a and 342b are 1 and the difference between the counts becomes zero.

On the other hand, as shown in FIG. 8B, when TE corresponding to a case where a lens shift has occurred on the inner radius side is input, the address section of the TE does not exceed the comparator level a of the comparator 341a. Thus, no outer radius gate signal is generated and only inner radius gate signals are generated from the comparator 341b. In this case, the counts of gate signals output from both the gate count sections 342a and 342b are 1 or 0 and the difference between the counts becomes 1.

As in the case of the second embodiment, by setting time intervals at which offset set values are generated so that the address gate section 340 receives a plurality of address sections, a more accurate relationship between the difference between the counts and the lens position based on the offset set values can be obtained.

Figure 12:
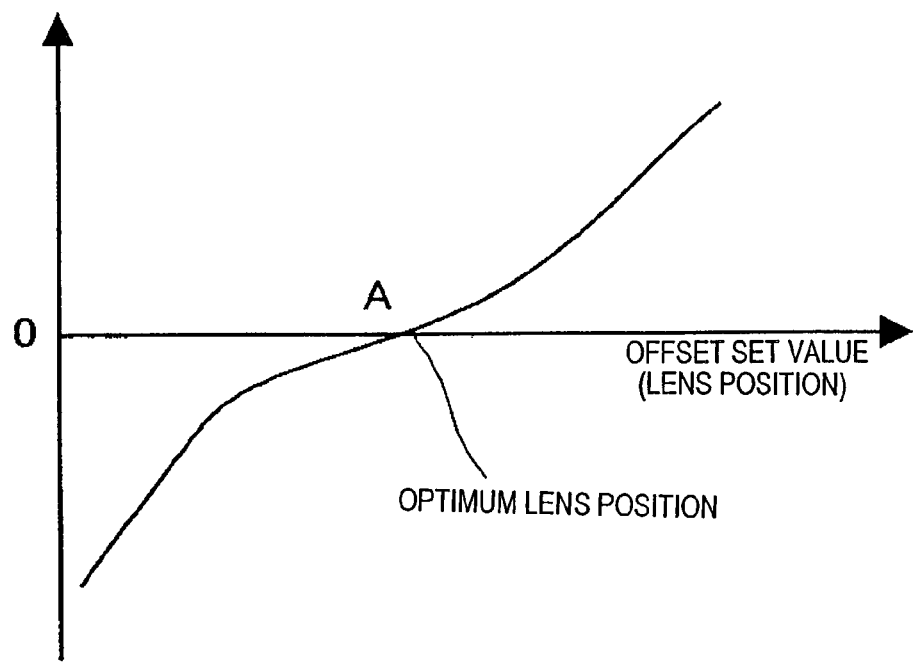
FIG. 12 illustrates a relationship between a gate count and an offset set value.

The relationship between the lens position based on the offset set values set by the lens position characteristic measuring section 362 and the difference between the counts is shown in FIG. 12. In FIG. 12, the horizontal axis shows the position of the converging lens and the vertical axis shows a count difference. Based on the offset set value, the lens position setting section 161 generates an offset and adds it to the tracking drive value, and therefore the horizontal axis also indicates a relative lens position. In the characteristic shown in FIG. 12, point A where the count difference becomes zero is an optimum lens position with no lens shift. The optimum lens position searching section 364 searches for a point at which the count difference stored in the memory 163 is zero or a value closest to zero and outputs the offset set value at that time to the lens position setting section 161 as the optimum lens position. The lens position setting section 161 generates an offset based on the offset set value received and superimposes the offset on the tracking drive value. The tracking drive signal with an offset added is output from the drive circuit 91, which corrects the lens shift and allows the RF difference signal at the address sections to always become a waveform with good symmetry as shown in FIG. 4A. That is, it is possible to obtain a good tracking signal and RF signal and provide a highly reliable optical disk apparatus.

As is explained above, according to the present invention, the lens shift of the converging lens with respect to the optical detector is adjusted based on the signal obtained by reading the first address and the second address of the information storage medium. More particularly, this preferred embodiment produces a difference signal which is obtained from signals detected by the divided detectors, compares the difference signal with the first and second levels at the first address portion and the second address portion and counts the number of times the difference signal exceeds the first and second levels. As the first address and the second address are shifted from the information track toward the inner radius side and outer radius side by approximately ½ track, respectively, the lens shift is zero or minimum when the difference between the number of times the difference signal exceeds the first level and the number of times the difference signal exceeds the second level becomes zero or an amount closest to zero.

Specifically, the position of the converging lens with respect to the optical detector is changed by successively generating the offset set values. Then, the difference between the number of times the difference signal exceeds the first level and the number of times the difference signal exceeds the second level is calculated at each position. The lens shift can be adjust to become zero or minimum by moving the converging lens using the offset set value which is given at the counting number equal to zero or closest to zero.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

Fourth Embodiment

Figure 13:
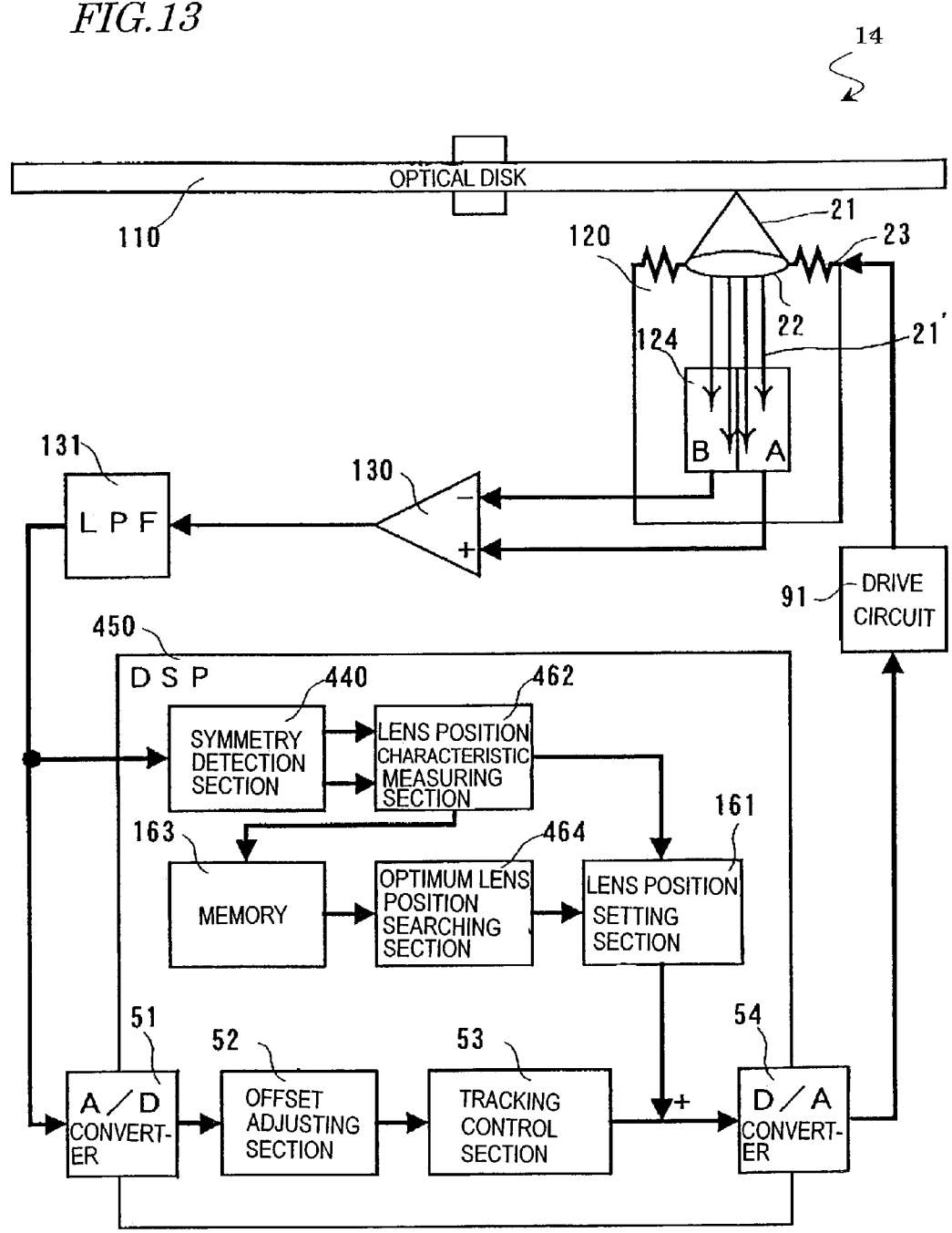
FIG. 13 is a block diagram showing a fourth embodiment of the optical disk apparatus of the present invention.

FIG. 13 is a block diagram showing a configuration of a tracking control apparatus according to this embodiment and an optical disk apparatus using this tracking control apparatus. In the optical disk apparatus 14, the same components as those of the optical disk apparatus 11 of the first embodiment are assigned the same reference numerals.

An optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium.

The optical pickup 120 is further provided with an optical detector 124 which includes detection sections A and B divided in a radial direction. The optical detector 124 which is an optical detecting part, detects a reflected beam 21' reflected by an information recording plane of the optical disk 110. The outputs of the detection sections A and B of the optical detector 124 are input to a subtraction circuit 130 which generates a signal obtained by subtracting a signal B corresponding to the quantity of light detected by the detection section B from a signal A corresponding to the quantity of light detected by the detection section A, that is, an RF difference signal of (A−B). The RF difference signal passes through a low pass filter (LPF) 131 and is input to a digital signal processor (DSP) 450 which is a tracking control apparatus as a tracking error signal (hereinafter referred to as "TE").

The DSP 450 includes a symmetry detection section 440, a lens position characteristic measuring section 462, a memory 163, an optimum lens position searching section 464, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 450 can add an offset to the tracking drive value which is the output of the tracking control section 53 and shift the position of the converging lens 22 relative to the position of the optical detector 124.

Furthermore, the TE which is the output from the LPF 131 is input to the symmetry detection section 440. The symmetry detection section 440 detects symmetry of the address section of the TE.

Figure 14:
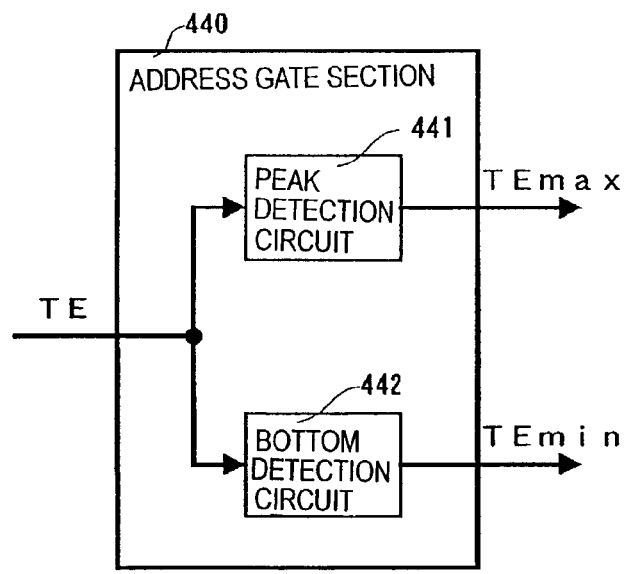
FIG. 14 is a block diagram showing a configuration of the symmetry detection section shown in FIG. 13.

FIG. 14 is a block diagram showing a more specific configuration of the symmetry detection section 440. The symmetry detection section 440 includes a peak detection circuit 441 which is a peak detecting part and a bottom detection circuit 442 which is a bottom detecting part. The peak detection circuit 441 holds a maximum value TEmax at the address section. Furthermore, the bottom detection circuit 442 holds a minimum value TEmin at the address section. The symmetry detection section 440 outputs TEmax and TEmin to the lens position characteristic measuring section 462 which is a lens position detecting part.

The lens position characteristic measuring section 462 outputs an offset set value to the lens position setting section 161 so that the lens position setting section 161 generates offsets for moving the position of the converging lens 22 one after another at predetermined spatial intervals. It is to be noted that the predetermined intervals are not necessarily the same with each other. And at the same time the lens position characteristic measuring section 462 calculates TE symmetry (TEmax+TEmin)/(TEmax−TEmin) at the offset set value. Then, the lens position characteristic measuring section 462 outputs the offset set value and the TE symmetry at that time to the memory 163. The memory 163 stores offset set values and TE symmetry one after another. The lens position setting section 161 generates offsets one after another based on the offset set values received from the lens position characteristic measuring section 462 and adds the offsets to the tracking drive value which is the output of the tracking control section 53.

As will be detailed below, the optimum lens position searching section 464 which is the lens shift adjusting part regards an offset set value when the TE symmetry becomes zero or a value closest to zero as an offset set value that gives an optimum lens position and outputs it to the lens position setting section 161. The lens position setting section 161 generates an offset based on the offset set value that gives the optimum lens position and adds it to the tracking drive value. This makes it possible to set the lens shift to zero.

Figure 15A:
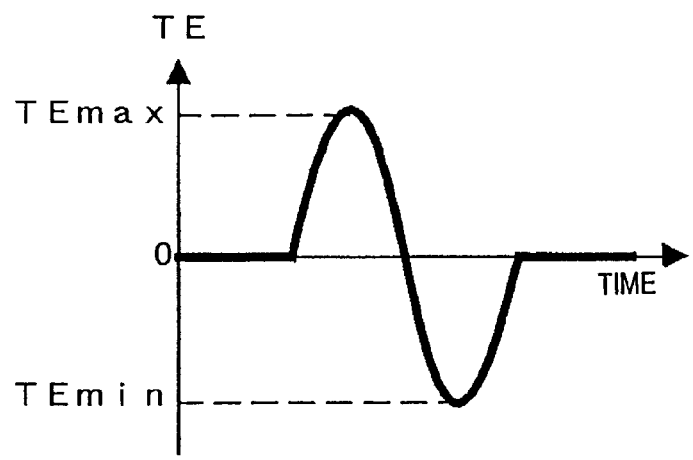
FIG. 15A and FIG. 15B illustrate a TE waveform of the address section input to the symmetry detection section.
Figure 15B:
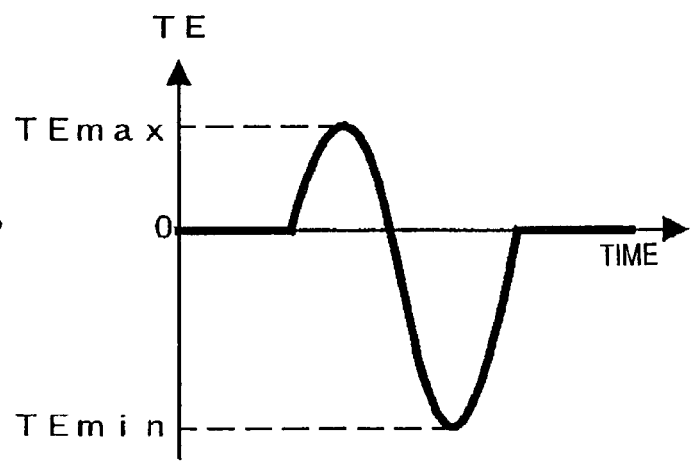

FIG. 15A and FIG. 15B show an enlarged and schematic view of waveforms at the address section of the TE input to the address gate section 440.

As shown in FIG. 15A, the waveform of the TE at the address section with no lens shift becomes symmetric with respect to zero. Thus, the TE symmetry (TEmax+TEmin)/(TEmax−TEmin) calculated from the output TEmax of the peak detection circuit 441 and the output TEmin of the bottom detection circuit 442 becomes zero or a value closest to zero.

On the other hand, as shown in FIG. 15B, when the TE waveform at the address section in a case where a lens shift has occurred on the inner radius side, becomes asymmetric with respect to zero. Thus, the TE symmetry (TEmax+

TEmin)/(TEmax−TEmin) calculated from the output TEmax of the peak detection circuit 441 and the output TEmin of the bottom detection circuit 442 becomes a negative value.

Figure 16:
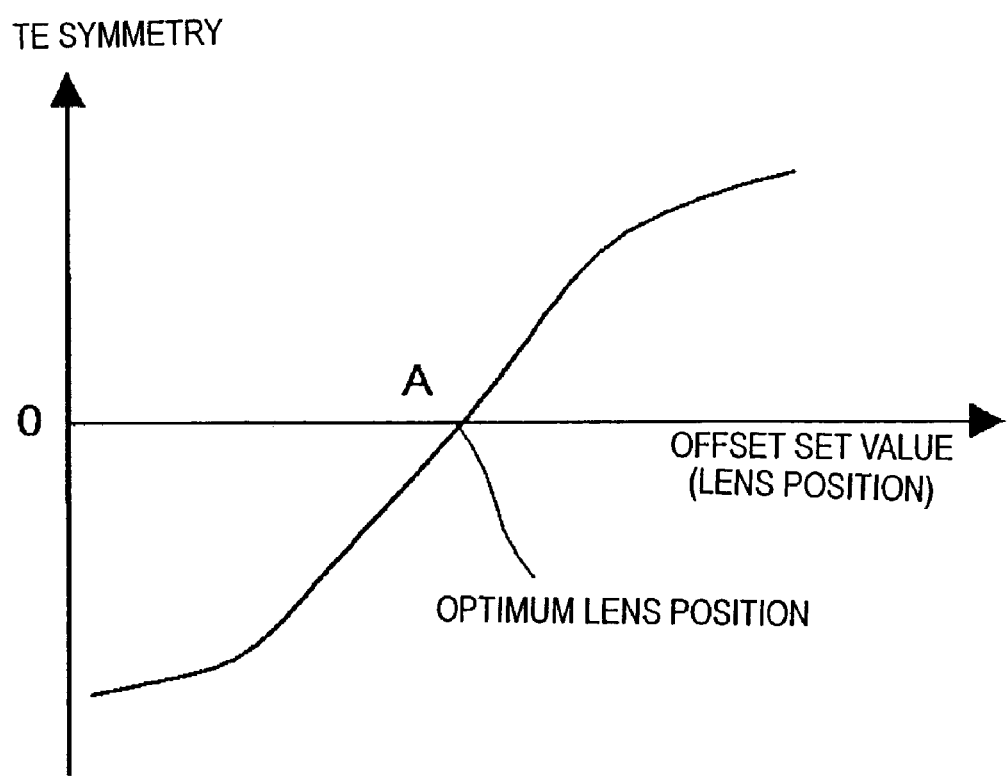
FIG. 16 illustrates a relationship between TE symmetry and an offset set value.

The relationship between the lens position based on the offset set values set by the lens position characteristic measuring section 462 and the TE symmetry is shown in FIG. 16. In FIG. 16, the horizontal axis shows the position of the converging lens and the vertical axis shows the TE symmetry. Based on the offset set value, the lens position setting section 161 generates an offset and adds it to the tracking drive value, and therefore the horizontal axis also indicates a relative lens position. In the characteristic shown in FIG. 16, point A where the TE symmetry becomes zero is an optimum lens position with no lens shift. The optimum lens position searching section 464 searches for a point at which the TE symmetry stored in the memory 163 is zero or a value closest to zero (e.g., a value closest to zero or a value closer to zero than a threshold which is a value close to zero) and outputs the offset set value at that time to the lens position setting section 161 as the optimum lens position. The lens position setting section 161 generates an offset based on the offset set value received and superimposes the offset on the tracking drive value. The tracking drive signal with an offset added is output from the drive circuit 91, which corrects the lens shift and allows the RF difference signal at the address sections to always become a waveform with good symmetry as shown in FIG. 4A. That is, it is possible to obtain a good tracking signal and RF signal and provide a highly reliable optical disk apparatus.

As is explained above, according to the present invention, the lens shift of the converging lens with respect to the optical detector is adjusted based on the signal obtained by reading the first address and the second address of the information storage medium. More particularly, this preferred embodiment obtains at a first and second addresses a maximum value and a minimum value of a difference signal which is obtained from signals detected by the divided detectors. As the first address and the second address are shifted from the information track toward the inner radius side and outer radius side by approximately ½ track, respectively, the lens shift is zero or minimum when the value of (maximum value+minimum value)/(maximum value−minimum value) becomes zero or an amount closest to zero.

Specifically, the position of the converging lens with respect to the optical detector is changed by successively generating the offset set values. Then, the value of (maximum value+minimum value)/(maximum value−minimum value) is calculated at each position. The lens shift can be adjust to become zero or minimum by moving the converging lens using the offset set value which is given at the calculated value equal to zero or closest to zero.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

Fifth Embodiment

Figure 17:
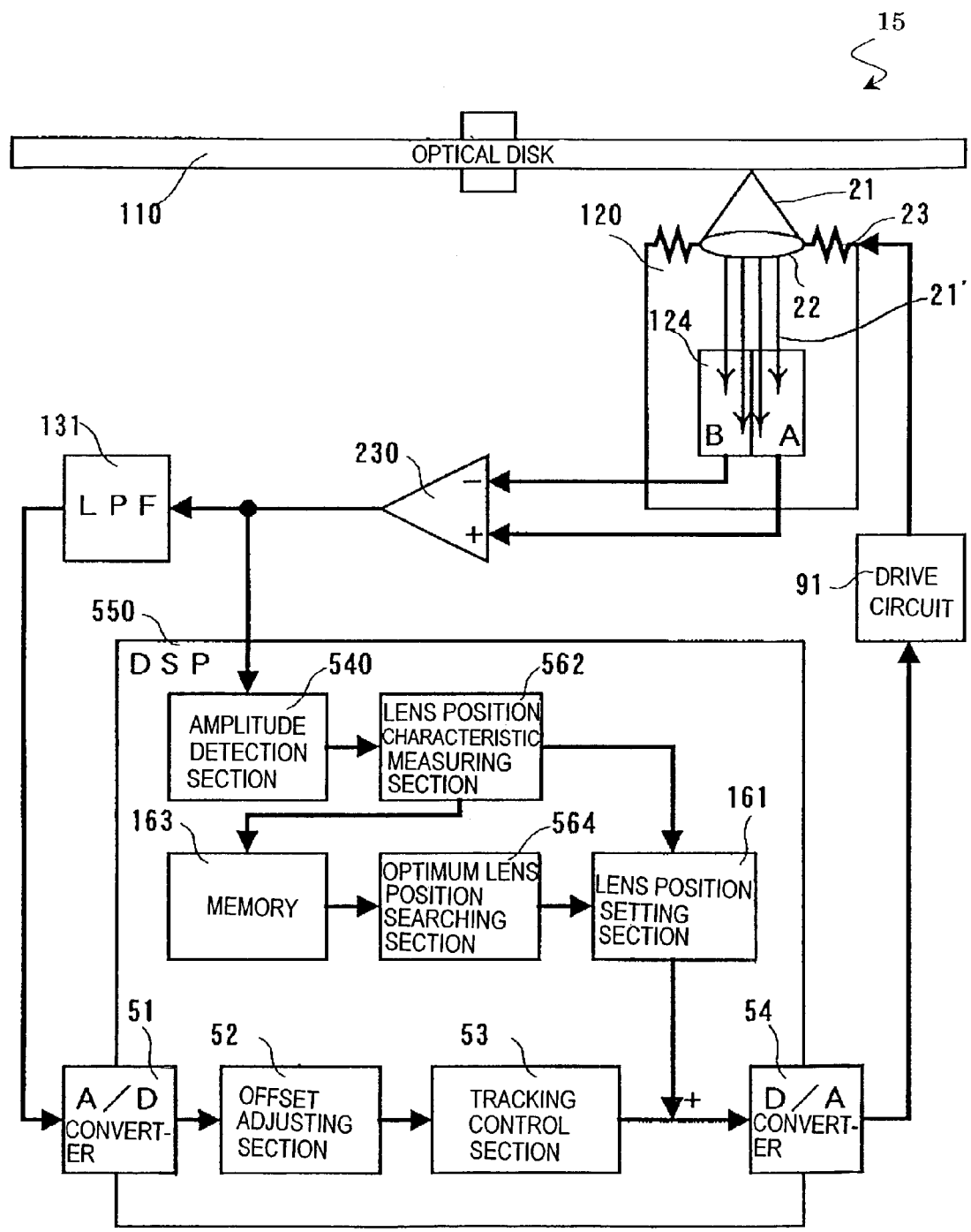
FIG. 17 is a block diagram showing a fifth embodiment of the optical disk apparatus of the present invention.

FIG. 17 is a block diagram showing a configuration of a tracking control apparatus according to this embodiment and an optical disk apparatus using this tracking control apparatus. In the optical disk apparatus 15, the same components as those of the optical disk apparatus 11 of the first embodiment are assigned the same reference numerals.

An optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium.

The optical pickup 120 is further provided with an optical detector 124 which includes detection sections A and B and the optical detector 124 which is an optical detecting part, detects a reflected beam 21' reflected by an information recording plane of the optical disk 110. The outputs of the detection sections A and B of the optical detector 124 are input to a subtraction circuit 230 which generates a signal obtained by subtracting a signal B corresponding to the quantity of light detected by the detection section B from a signal A corresponding to the quantity of light detected by the detection section A, that is, an RF difference signal of (A−B). The RF difference signal passes through a low pass filter (LPF) 131 and is input to a digital signal processor (DSP) 550 which is a tracking control apparatus as a tracking error signal (hereinafter referred to as "TE").

The DSP 550 includes an amplitude detection section 540, a lens position characteristic measuring section 562, a memory 163, an optimum lens position searching section 564, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 550 can add an offset to the tracking drive value which is the output of the tracking control section 53 and shift the position of the converging lens 22 relative to the position of the optical detector 124.

Furthermore, the RF difference signal which is the output from the subtraction circuit 230 is input to the amplitude detection section 540 which is first and second address amplification detecting part. The amplitude detection section 540 detects an amplitude of the address section of the RF difference signal.

Figure 18:
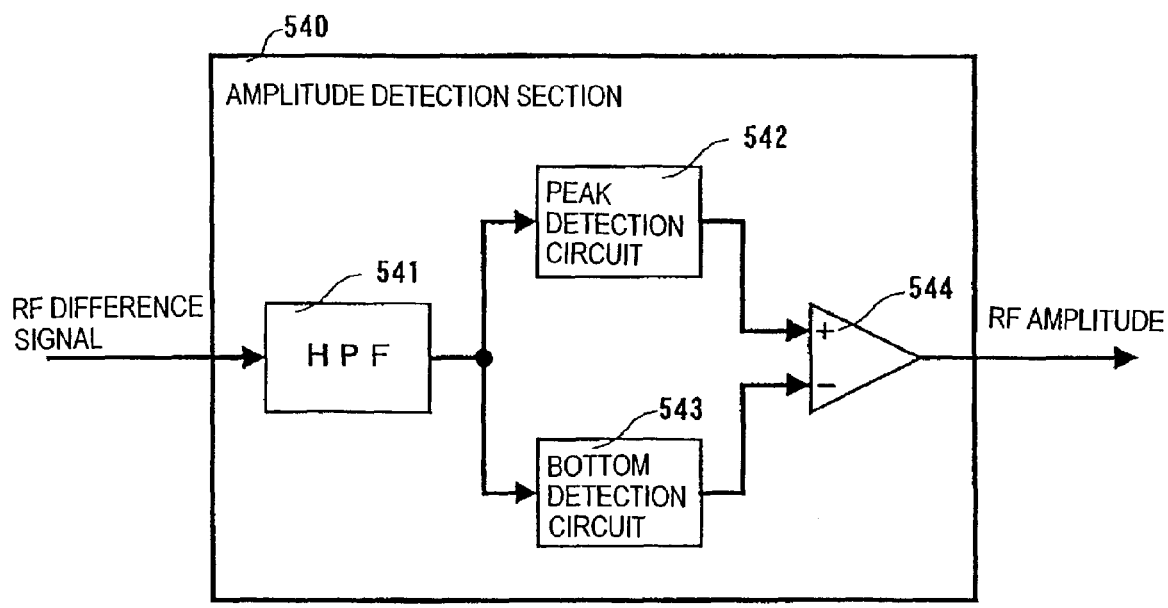
FIG. 18 is a block diagram showing a configuration of the amplitude detection section shown in FIG. 17.

FIG. 18 is a block diagram showing a more specific configuration of the amplitude detection section 540. The amplitude detection section 540 includes an HPF (high pass filter) 541, a peak detection circuit 542, a bottom detection circuit 543 and a subtraction circuit 544.

When the RF difference signal input to the amplitude detection section 540 passes through the HPF 541, its DC part is removed. The RF signal stripped of the DC part is input to the peak detection circuit 542 and bottom detection circuit 543 in parallel. The peak detection circuit 542 and bottom detection circuit 543 hold a maximum value and a minimum value of the RF signal stripped of the DC part, respectively and outputs the value to the subtraction circuit 544. The subtraction circuit 544 calculates a difference between the maximum value and the minimum value and outputs the value to the lens position characteristic measuring section 562 which is a lens position characteristic measuring part as the RF signal amplitude.

The lens position characteristic measuring section 562 outputs an offset set value to the lens position setting section 161 so that the lens position setting section 161 generates offsets for moving the position of the converging lens 22 one after another at predetermined spatial intervals. It is to be noted that the predetermined intervals are not necessarily the same with each other. Furthermore, the lens position characteristic measuring section 562 calculates a difference between the RF signal amplitude at a first address section A1 located on the inner radius side and that at a second address section A2 (FIG. 3) located on the outer radius side with respect to a track. Then, the lens position characteristic measuring section 562 outputs the offset set value and the difference in the RF signal amplitude at that time to the memory 163. The memory 163 stores the offset set values and differences in the RF signal amplitude one after another. The lens position setting section 161 generates offsets one after another based on the offset set values received from the lens position characteristic measuring section 562 and adds the offsets to the tracking drive value which is the output of the tracking control section 53.

As will be detailed below, the optimum lens position searching section 564 which is a lens shift adjusting part regards an offset set value when the difference in the RF signal amplitude becomes zero or a value closest to zero as an offset set value that gives an optimum lens position and outputs it to the lens position setting section 161. The lens position setting section 161 generates an offset based on the offset set value that gives the optimum lens position and adds it to the tracking drive value. This makes it possible to set the lens shift to zero.

Figure 19A:
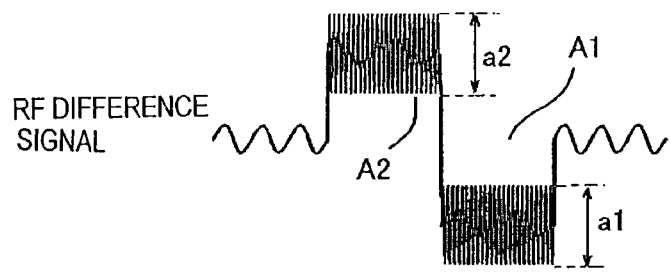
FIG. 19A and FIG. 19B illustrate a waveform of an RF difference signal at the address section input to the amplitude detection section.
Figure 19B:
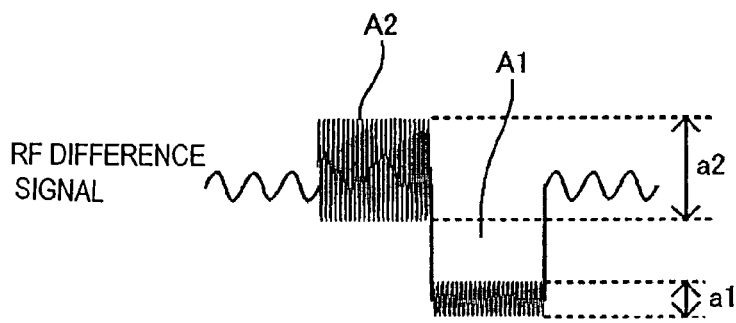

When the address section of the optical disk 110 having the structure shown in FIG. 3 is reproduced, the RF difference signal has waveforms as shown in FIG. 19A and 19B. As shown in FIG. 19A, when an RF difference signal with no lens shift is input to the amplitude detection section 540, an RF signal amplitude a1 at the first address section A1 becomes almost equal to an RF signal amplitude a2 at the second address section A2. For this reason, the difference in the RF signal amplitude between the two sections becomes almost zero.

On the other hand, as shown in FIG. 19B, when TE corresponding to a case where a lens shift has occurred on the inner radius side is input, the RF signal amplitude a2 at the second address section A2 becomes greater than RF signal amplitude a1 at the first address section A1. Thus, the difference (a1−a2) in the RF signal amplitude between the two sections becomes a negative value.

Figure 20:
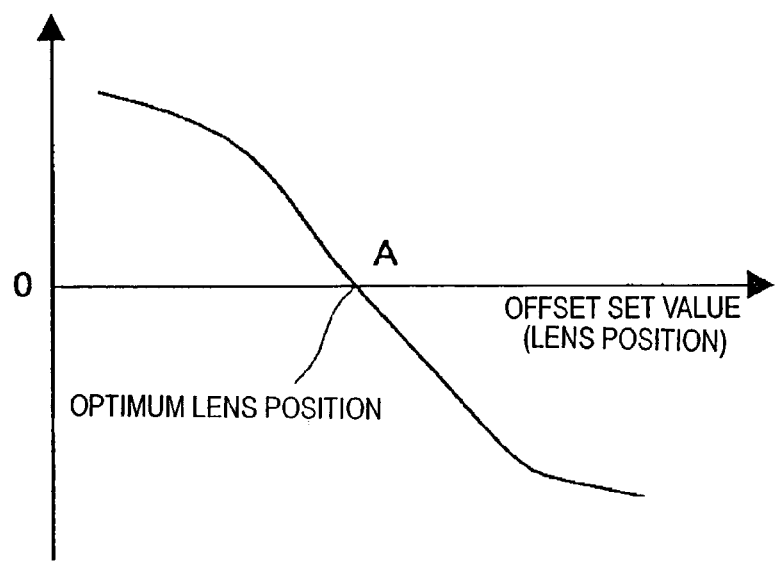
FIG. 20 illustrates a relationship between the amplitude of an RF difference signal and offset set value.

The relationship between the lens position based on the offset set values set by the lens position characteristic measuring section 562 and difference in the RF signal amplitude is shown in FIG. 20. In FIG. 20, the horizontal axis shows the position of the converging lens and the vertical axis shows the difference in the RF signal amplitude. Based on the offset set value, the lens position setting section 161 generates an offset and adds it to the tracking drive value, and therefore the horizontal axis also indicates a relative lens position. In the characteristic shown in FIG. 20, point A where the difference in the RF signal amplitude becomes zero is an optimum lens position with no lens shift. The optimum lens position searching section 564 searches for a point at which the difference in the RF signal amplitude stored in the memory 163 is zero or a value closest to zero and outputs the offset set value at that time to the lens position setting section 161 as the optimum lens position. The lens position setting section 161 generates an offset based on the offset set value received and superimposes the offset on the tracking drive value. The tracking drive signal with an offset added is output from the drive circuit 91, which corrects the lens shift and allows the RF difference signal at the address sections to always become a waveform with good symmetry as shown in FIG. 4A. That is, it is possible to obtain a good tracking signal and RF signal and provide a highly reliable optical disk apparatus.

As is explained above, according to the present invention, the lens shift of the converging lens with respect to the optical detector is adjusted based on the signal obtained by reading the first address and the second address of the information storage medium. More particularly, this preferred embodiment produces difference signal which is obtained from signals detected by the divided detectors and obtains amplitudes of the difference signal at the first address and the second address. As the first address and the second address are shifted from the information track toward the inner radius side and outer radius side by approximately ½ track, respectively, the lens shift is zero or minimum when the difference between the amplitude at the first address and the amplitude at the second address becomes zero or an amount closest to zero.

Specifically, the position of the converging lens with respect to the optical detector is changed by successively generating the offset set values. Then, the difference between the amplitude at the first address and the amplitude at the second address is calculated at each position. The lens shift can be adjust to become zero or minimum by moving the converging lens using the offset set value which is given at the counting number equal to zero or closest to zero.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

Sixth Embodiment

Figure 21:
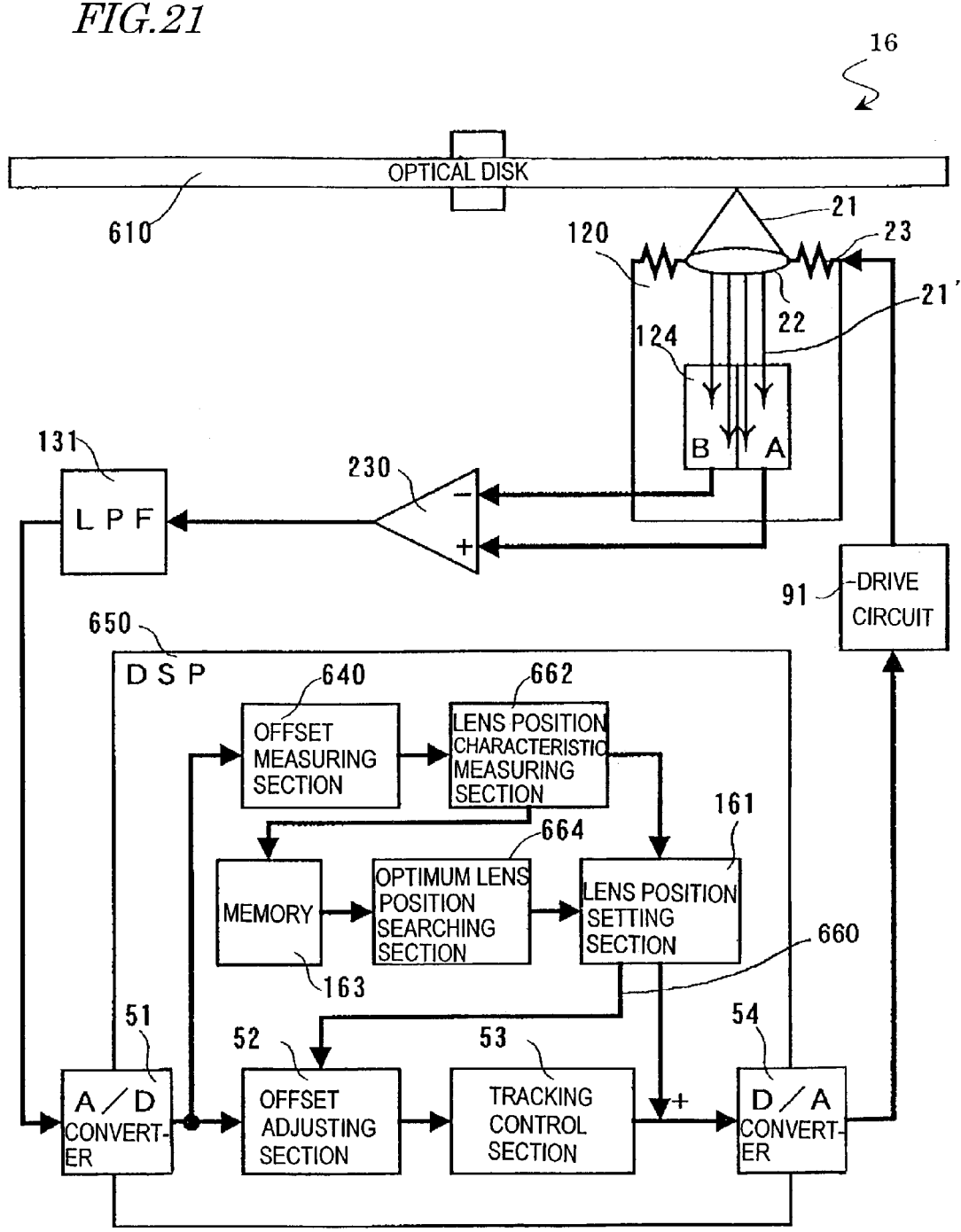
FIG. 21 is a block diagram showing a sixth embodiment of the optical disk apparatus of the present invention.

FIG. 21 is a block diagram showing a configuration of a tracking control apparatus according to this embodiment and an optical disk apparatus using this tracking control apparatus. In the optical disk apparatus 16, the same components as those of the optical disk apparatus 11 of the first embodiment are assigned the same reference numerals.

An optical pickup 120 is provided with a light-emitting element (not shown) such as laser, a converging lens 22 which is a converging part and an actuator 23 which is a moving part, and the converging lens 22 converges and at the same time irradiates an optical beam 21 onto an optical disk 110 which is an information storage medium.

The optical pickup 120 is further provided with an optical detector 124 which includes detection sections A and B and the optical detector 124 which is an optical detecting part, detects a reflected beam 21' reflected by an information recording plane of the optical disk 110. The outputs of the detection sections A and B of the optical detector 124 are input to a subtraction circuit 230 which generates a signal obtained by subtracting a signal B corresponding to the quantity of light detected by the detection section B from a signal A corresponding to the quantity of light detected by the detection section A, that is, an RF difference signal of (A−B). The RF difference signal passes through a low pass filter (LPF) 131 and is input to a digital signal processor (DSP) 650 which is a tracking control apparatus as a tracking error signal (hereinafter referred to as "TE").

The DSP 650 includes an offset measuring section 640, a lens position characteristic measuring section 662, a memory 163, an optimum lens position searching section 664, a lens position setting section 161, an A/D converter 51, an offset adjusting section 52, a tracking control section 53 and a D/A converter 54.

The A/D converter 51 converts TE to a digital signal. The offset adjusting section 52 adds a predetermined offset to the TE converted to the digital signal and outputs it to the tracking control section 53. The tracking control section 53 generates a tracking drive value by applying a filter operation for carrying out phase compensation and low-frequency compensation to the TE converted to the digital signal. The tracking drive value generated is added to the output of the lens position setting section 161 and converted to an analog signal by a D/A converter 54 again. The output of the D/A converter 54 becomes a tracking drive signal and is output to the drive circuit 91.

The drive circuit 91 carries out current amplification on the tracking drive signal, drives the actuator 23 which is the moving part built in the optical pickup 120 to carry out tracking control. At this time, the lens position setting section 161 of the DSP 650 can add an offset to the tracking drive value which is the output of the tracking control section 53 and shift the position of the converging lens 22 relative to the position of the optical detector 124.

Furthermore, the TE converted to a digital signal by the A/D converter 51 is input to the offset measuring section 640. The offset measuring section 640 determines an average value (offset) of TE and outputs the value to the lens position characteristic measuring section 662. The average value is reset based on the information received from the lens position characteristic measuring section 662. That is the lens position characteristic measuring section 662 instructs the timing at which the offset measuring section 640 should calculate an average value. Alternatively, the offset measuring section 640 may determine a predetermined period for calculating the average value of TE.

The lens position characteristic measuring section 662 outputs an offset set value to the lens position setting section 161 so that the lens position setting section 161 generates offsets for moving the position of the converging lens 22 one after another at predetermined spatial intervals. The predetermined spatial intervals are not necessarily the same with each other. Furthermore, in order to determine an average value of TE at the offset value, the lens position characteristic measuring section 662 outputs a signal to the offset measuring section 640 and receives an average value of TE at the offset set value from the offset measuring section 640. In the case where the offset measuring section 640 determines the predetermined period for calculating the average value of TE, another offset value may be generated each time the lens position characteristic measuring section 662 receives the average value of TE. The lens position characteristic measuring section 662 outputs the offset set value and the average value of TE at that time to the memory 163. The memory 163 stores offset set values and the differences in the RF signal amplitude one after another. The lens position setting section 161 generates offsets one after another based on the offset set values received from the lens position characteristic measuring section 662 and adds the offsets to the tracking drive value which is the output of the tracking control section 53.

The optical disk apparatus 16 carries out this procedure on the area A and area B with different natures of the optical disk 610. Then, as will be detailed below, the optimum lens position searching section 664 which is the lens shift adjusting part determines a point of intersection between a curve indicating a relationship between the offset set value in the area A and the average value of TE and a curve indicating a relationship between the offset set value in the area B and the average value of TE, and outputs the offset set value at this point of intersection to the lens position setting section 161 as the offset set value that gives an optimum lens position. The lens position setting section 161 generates an offset based on the offset set value that gives the optimum lens position and adds it to the tracking drive value. This makes it possible to set the lens shift to zero.

Figure 22:
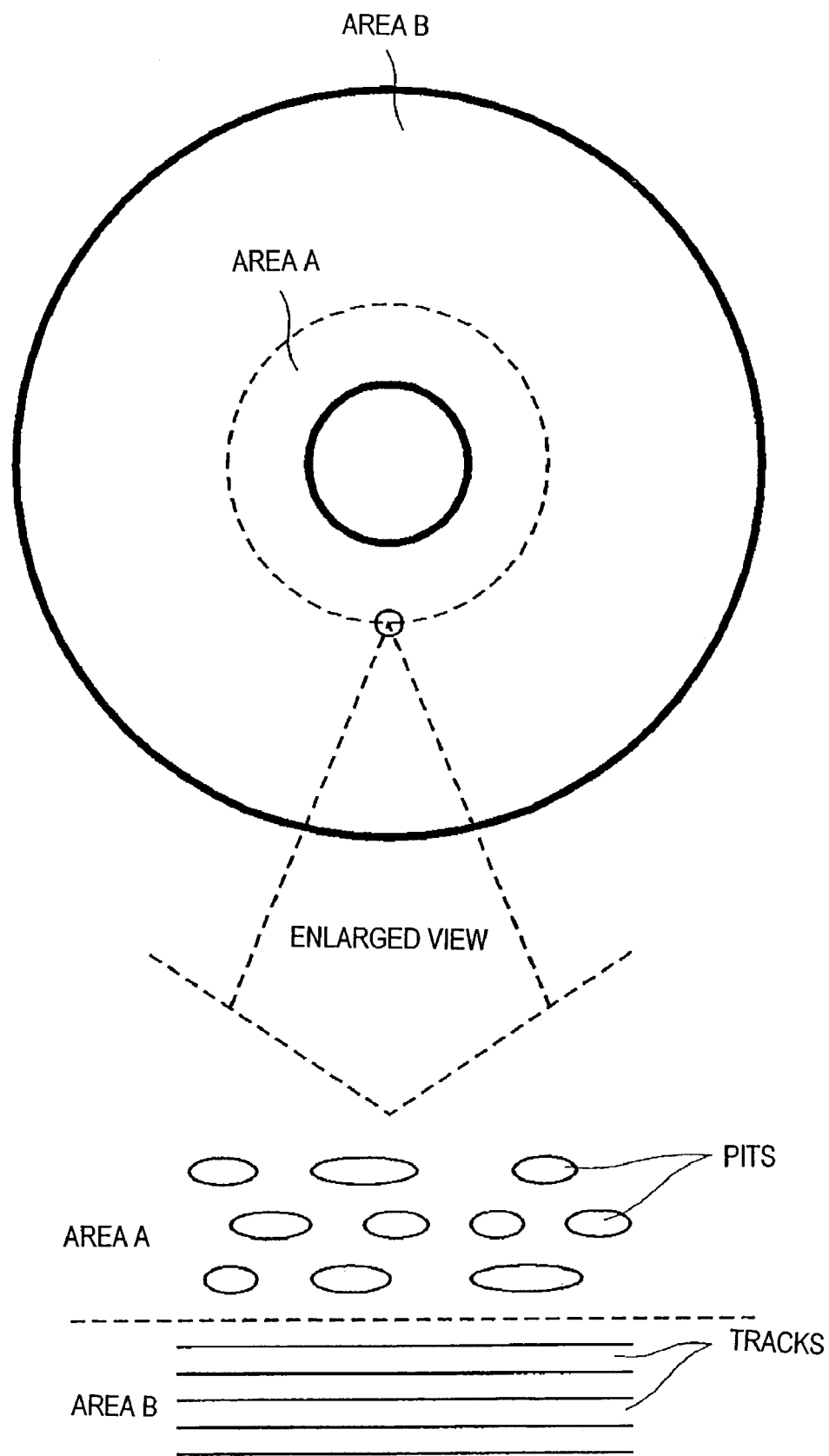
FIG. 22 is a schematic view of an optical disk having two areas with different characteristics.

As shown in FIG. 22, the optical disk 610 includes the area A and area B. The area A is constructed of tracks using pits and tracks of the area B are constructed of guide grooves of a concavo-convex shape. Since these two areas are different in the depths of groove and track pitches, they have different reflective characteristics with respect to the optical beam 21 and different TE modulation factors. For this reason, they are different in a characteristic between offsets generated and a lens position, that is, sensitivity of a TE offset with respect to the lens position.

Generally, not only an offset by a lens shift but also circuit offsets caused by the optical detector 124 and subtraction circuit 230, etc., are superimposed on the TE offset. It is difficult to separate these offsets, and so it is not possible to search the optimum lens position with no lens shift from the TE offsets. However, for two areas A and B having different characteristics, when a relationship between their respective offset set values and TE average value is determined, the curves indicating the relationship between the two intersect at one point. At this point, even if the sensitivity of the TE offsets with respect to the lens positions of the areas A and B differs, no lens shift has occurred, and therefore both areas have the same combination of offset set value and TE offset.

Figure 23:
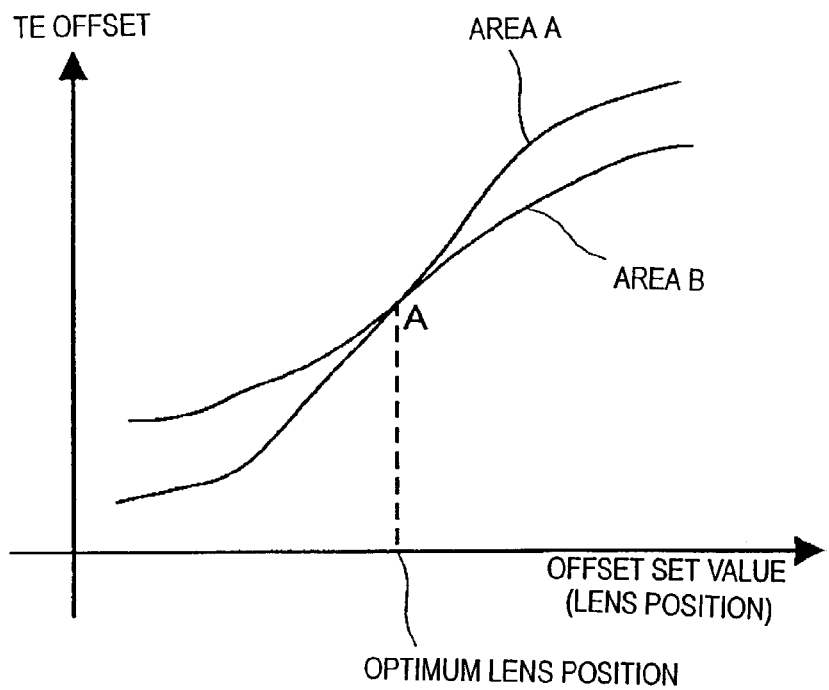
FIG. 23 illustrates a relationship between a TE offset and offset set value.

FIG. 23 shows a relationship between a lens position based on the offset set value set by the lens position characteristic measuring section 662 and a TE average value (offset) in the areas A and B. In FIG. 23, the horizontal axis shows the position of the converging lens and the vertical axis shows the TE average value. Since the lens position setting section 161 generates an offset based on the offset set value and adds it to the tracking drive value, the horizontal axis also indicates a relative lens position.

At a point of intersection A between the characteristic curves of the area A and area B, no lens shift has occurred from the above-described reasons and only a detection difference of the optical detector 124 and circuit offsets are included. Therefore, the lens position at the point of intersection A is an optimum lens position with no lens shift. The optimum lens position searching section 664 executes the above-described procedure. That is, a point of intersection between a curve indicating the relationship between the offset set value in the area A and TE average value and a curve indicating the relationship between the offset set value in the area B and TE average value is determined from the data stored in the memory 163, the offset set value at this point of intersection is regarded as an offset set value that give an optimum lens position and output to the lens position setting section 161. The lens position setting section 161 generates an offset based on the offset set value received and superimposes the offset on the tracking drive value. The tracking drive signal with the offset added is output from the drive circuit 91, the lens shift is thereby corrected and the RF difference signal at the address section has a waveform with good symmetry as shown in FIG. 4A. That is, it is possible to obtain a good tracking signal and RF signal and provide an optical disk apparatus with high reliability.

Furthermore, as is apparent from the above-described explanation, the TE average value at the point A in FIG. 23 indicates an offset by factors other than a lens shift. Therefore, it is also possible to input the TE average value at point A to the offset adjusting section 52 as shown by the arrow 660 and remove the TE offset caused by other than lens shift. This also makes it possible to adjust the lens shift and adjust the TE offset simultaneously.

As is explained above, according to the present invention, the lens shift of the converging lens with respect to the optical detector is adjusted based on the signal obtained by reading the first area and the second area which are provided in the information storage medium and have different reflective characteristics. More particularly, this preferred embodiment produces a difference signal from signals detected by the detectors disposed in a radial direction and obtains average values of the difference signal at the first area and the second area. As the first area and the second area have different reflective characteristics, the degrees in affection of the difference signal with respect to the lens shift may be different between the first area and the second area. Nonetheless, the affection of the difference signal with respect to the lens shift does not exist when the lens shift becomes zero. That is, the average value of the difference signal at the first area matches to the average value of the difference signal at the second area.

Specifically, the position of the converging lens with respect to the optical detector is changed by successively generating the offset set values. Then, the average value of the difference signal at the first area and the average value of the difference signal at the second area are calculated. The lens shift can be adjust to become zero or minimum by moving the converging lens using the offset set value which is given at the intersection of the relationship between the offset value and the average value at the first area and the relationship between the offset value and the average value at the second area.

Therefore, even if the mounting errors of optical parts or the deviation of optical axis may be caused in an apparatus which uses no phase difference tracking error signal and includes no phase difference adjusting circuit or an optical pickup which has simply divided optical detectors, an excellent tracking signal and a RF signal can be obtained.

In the above-described embodiment, before the optimum lens position is searched and set, an offset may occur with the TE due to a lens shift, making tracking control unstable. For this reason, tracking control may fail during measurement of the lens position characteristic, etc., to search for an optimum lens position. In such a case, the offset adjusting section 52 removes the TE offset before searching for the optimum lens position, and can thereby realize stable tracking control and configure a high reliability tracking apparatus in measurement of the lens position characteristic.

Furthermore, after the optimum lens position is searched and set, the TE offset changes because the lens position has been adjusted, and therefore tracking control may be unstable. In such a case, by removing the TE offset generated due to a change in the lens position by the setting of the optimum lens position through the offset adjusting section 52 after searching and setting the optimum lens position, it is possible to realize stable tracking control and configure a highly reliable tracking apparatus.

Thus, if the tracking error signal offset is removed before searching and setting the optimum lens position, it is possible to correct the lens shift without being affected by shifts of the track position due to the offset of the tracking error signal. Furthermore, if the tracking control offset is removed after the optimum lens position is searched and set, it is possible to remove offsets of the tracking error signal also including offsets generated by lens shifts. This makes it possible to realize high precision tracking control with lens shifts and shifts of the tracking position corrected. Whether the offset of the tracking error signal should be removed before searching for the optimum lens position or the offset of the tracking error signal should be removed after searching for the optimum lens position or the offset of the tracking error signal should be removed before and after searching the optimum lens position may be determined according to the accuracy, etc., determined for the tracking apparatus.

By the way, when the lens position characteristic is measured, an offset occurs on the TE due to a change in the lens position and the tracking control target shifts, and therefore there is a possibility that the lens position characteristic affected by the track position shift will be measured causing a shift in the result of searching the optimum lens position. In this case, to eliminate influences of this track position shift, an offset characteristic of the TE accompanying the change in the lens position is measured beforehand. Then, according to the change in the lens position when measuring the lens position characteristic, the TE offset is adjusted based on the TE offset characteristic measured beforehand. This eliminates the influence of the TE offset in measurement of the lens position characteristic and makes it possible to improve the accuracy in searching for the optimum lens position.

Figure 24:
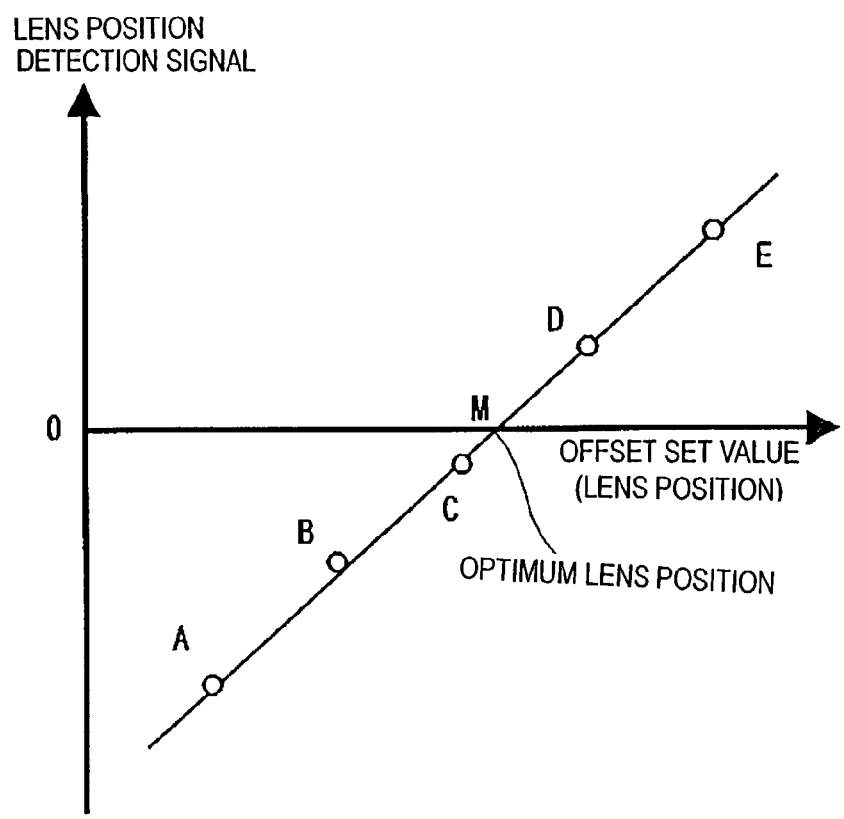
FIG. 24 illustrates a relationship between a lens position detection signal and offset set value.

Furthermore, it is also possible to assume the offset set value stored in the memory 131 and the lens position detection signal calculated by the lens position characteristic measuring section such as the number of address OK signals at that time as x and y, respectively, approximate these relationships with a function y=f(x) and improve the accuracy of searching for the optimum lens position. When deciding coefficients of the approximated function, a method of least squares is used, for example. As explained in the third, fourth and fifth embodiments, when the offset set value and the lens position detection signal obtained by the lens position characteristic measuring section at that time are in a linear relationship, it is desirable to obtain two or more pairs of the offset set value and the lens position detection signal at that time and approximate these relationships with a linear function y=ax+b. FIG. 24 shows an example where these relationships are approximated by a linear function. In FIG. 24, the horizontal axis shows an offset set value x and the vertical axis shows a lens position detection signal y. Since the lens position setting section 161 generates an offset and adds it to the tracking drive value based on the offset set value, the horizontal axis also shows a relative lens position. By deciding a coefficient and b from measuring points A to E in FIG. 24 using a method of least squares, an approximated linear function y=ax+b is obtained. If this approximated function is used, x when lens position detection signal y is 0 is −b/a. Therefore, by regarding this value as an offset set value, it is possible to suppress influences of measuring errors of the lens position detection signal and improve the accuracy of searching for the optimum lens position.

Figure 25:
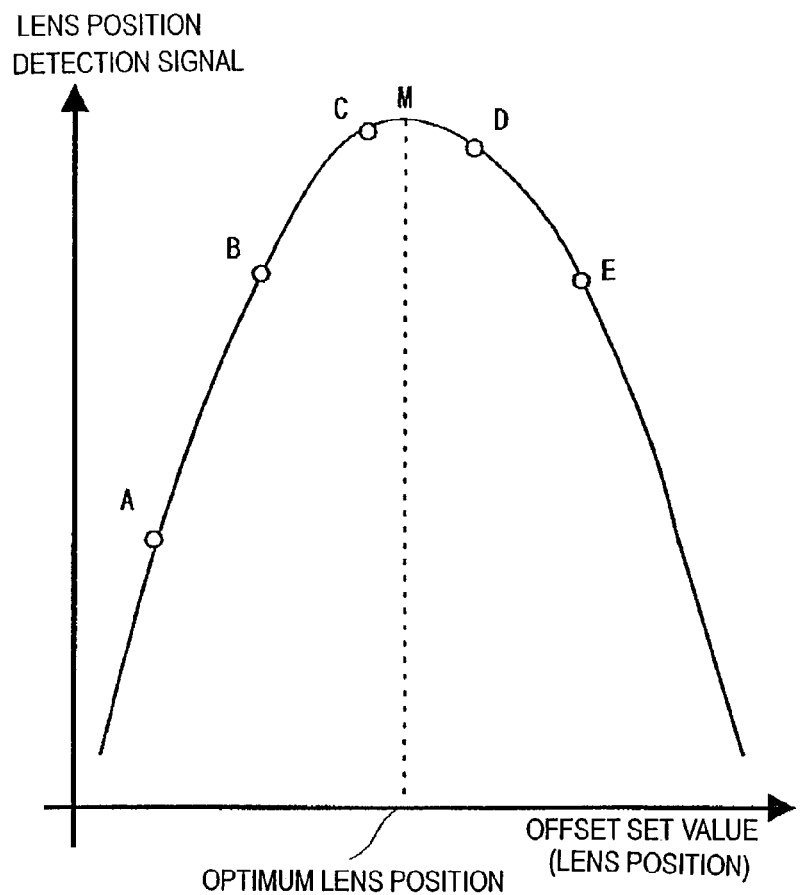
FIG. 25 illustrates a relationship between a lens position detection signal and offset set value.

Furthermore, as in the case of the first and second embodiments, when a maximum value or minimum value is searched in the characteristic of the lens position, it is desirable to approximate the relationship between the offset set value and the lens position detection signal at that time with a quadratic function $y=ax^2+bx+c$. FIG. 25 shows an example of the lens position characteristic approximated by a quadratic function. In FIG. 25, the horizontal axis shows an offset set value x and the vertical axis shows a lens position-detection signal y. Since the lens position setting section 161 generates an offset based on the offset set value and adds it to the tracking drive value, the horizontal axis also shows a relative lens position. By deciding coefficients a, b and c from measuring points A to E in FIG. 25 using a method of least squares, it is possible to obtain an approximated quadratic function $y=ax^2+bx+c$. In this quadratic function, x corresponding to a maximum value of the lens position detection signal y is b/2a. Therefore, by regarding this value as an offset set value, it is possible to suppress influences due to a measuring error of the lens position detection signal and improve the accuracy of searching for the optimum lens position.

Especially in a search for the optimum lens position using these approximated functions, even if the offset set value x when the lens position detection signal y is zero or a maximum is not determined, it is possible to estimate an offset set value x corresponding to zero or a maximum value of the lens position detection signal y from the approximated functions. Thus, even if intervals of the offset set values to be set by the lens position characteristic measuring section are not small, it is possible to set an optimum lens position exactly. Furthermore, the number of offset set values x for a search can also be reduced, it is also possible to shorten a search time.

Figure 26:
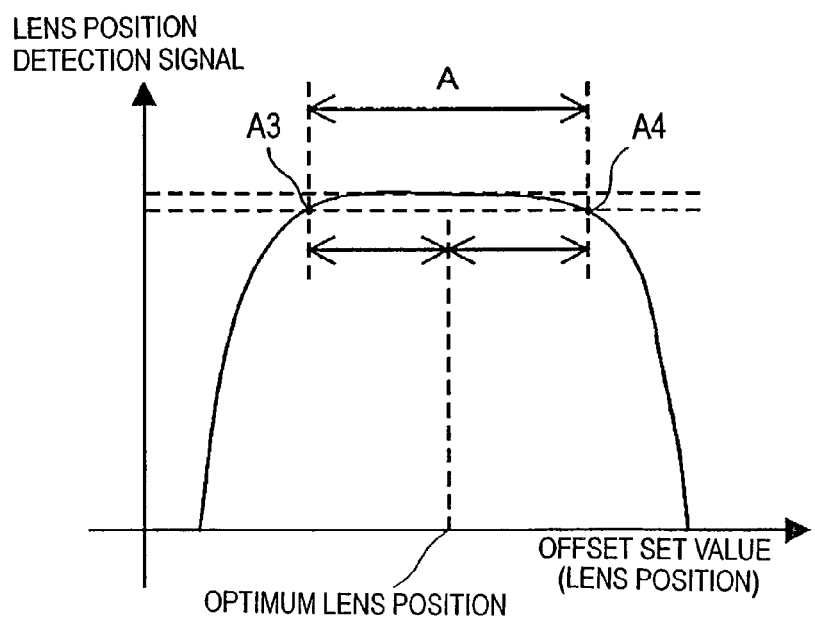
FIG. 26 illustrates a relationship between a lens position detection signal and offset set value.

In the above-described embodiment, when there is little eccentricity of an optical disk and little influence of lens shifts due to eccentricity, a variation near a maximum (or minimum) of the lens position detection signal may be slower in the lens position characteristic showing a relationship between an offset set value and lens position detection signal as shown in FIG. 26. In this case, the range in which the lens position detection signal reaches a maximum (or minimum) corresponds to a range shown by A in FIG. 26. In areas towards the ends of the range A, however, the lens position detection signal may vary drastically in response to a fine variation of the offset value. That is, if an offset value near the end points A3 and A4 of the range A is selected as the one that gives an optimum lens position, a margin due to a shift of the lens position becomes narrower.

Thus, in such a case, by determining a range A which reaches a maximum from the measurement result and selecting the center of the range A as an offset value that gives the optimum lens position, it is possible to widen the margin of the lens position shift and provide stable tracking control.

Furthermore, when tracking control is performed, the lens shift condition may change according to the rotation phase of the disk due to the existence of eccentricity of the disk. In this case, the result of searching for the optimum lens position depends on the rotation phase of the disk in measurement of the lens position characteristic. To prevent this, it is desirable to measure the lens position characteristic and average influences by eccentricity when the disk is turned once or an integer multiple of times. Or it is also possible to measure the lens position characteristic for each range of a predetermined rotation phase and determine and set an optimum lens position according to the rotation phase. Such methods allow stable tracking control even if there is a lens shift due to eccentricity of the disk.

When information is recorded or reproduced on both protrusions and depressions of a track of the optical disk, it is possible to constitute a tracking control apparatus free of influences of the concavo-convex shape of the track by measuring the lens position characteristic at the protrusions and depressions separately to absorb variations of the lens position characteristic due to these protrusions and depressions and setting optimum lens positions for the protrusions and depressions separately.

Furthermore, due to warpage of the optical disk, a tilt condition may change depending on the diameter position. Once a tilt occurs on the optical axes of the optical disk and light beam, the reflected light of the light beam is deviated from the optical detector, affecting the lens shift characteristic. In such a case, it is possible to provide stable tracking control free of influences of a tilt variation by applying linear interpolation to the result of adjusting lens shifts at the position on the inner radius side and outer radius side of the optical disk and setting an optimum lens position according to the diameter position.

Figure 27A:
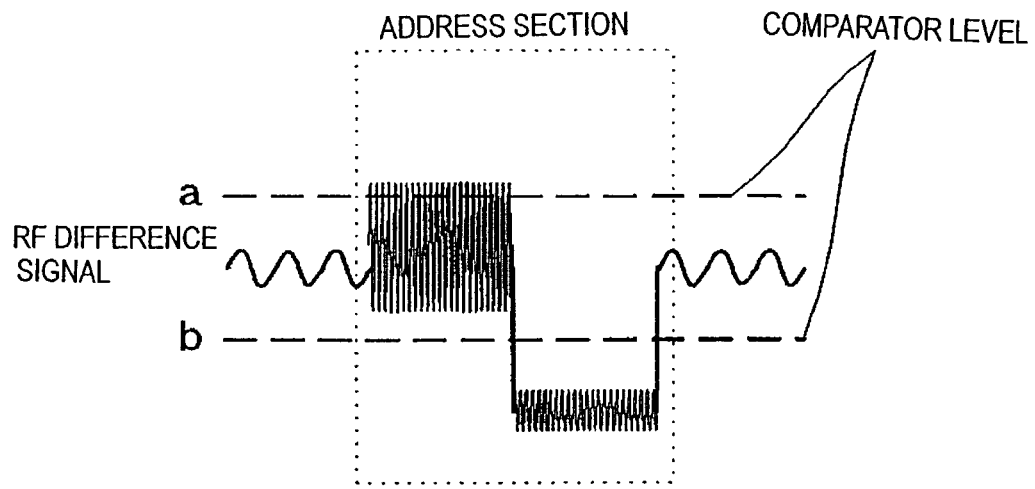
FIG. 27A and FIG. 27B illustrate a waveform of an RF difference signal.

With an optical disk apparatus in general, in order to make it possible to detect addresses even if there are lens shifts due to eccentricity of the disk, predetermined levels of the comparator in the address gate section are set low to an extent that a gate can be generated even at the lens position when a lens shift due to eccentricity of the disk reaches a maximum. However, when the predetermined level of the address gate section is low in the second and third embodiments, it is not possible to detect subtle variations of waveforms due to a tiny shift of the lens position and an address gate signal is generated even if the waveform is not normal. For example, as shown in FIG. 27A, when levels a and b of the comparator are low, the comparator levels a and b are exceeded though the waveform in the address section of an RF difference signal is asymmetric, two gate signals are generated.

Figure 27B:
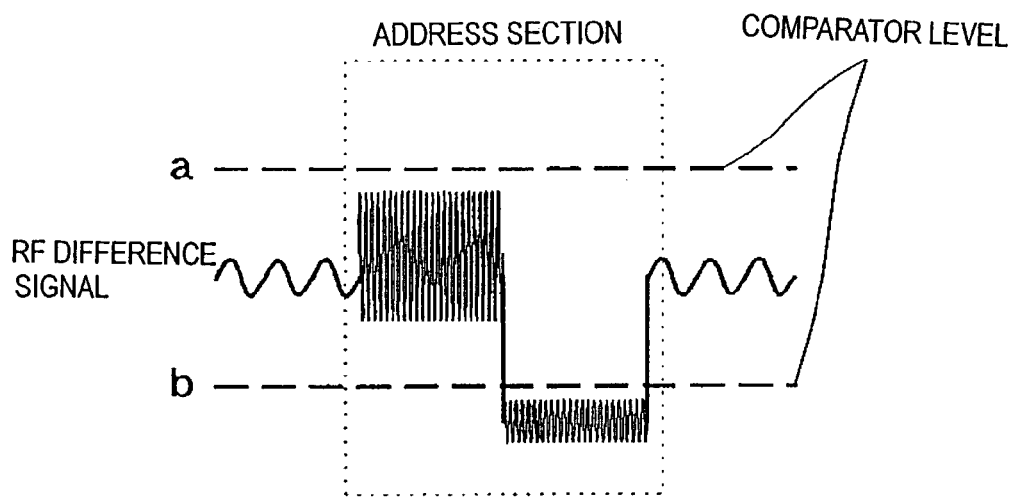

Thus, in the second and third embodiments, it is desirable to set comparator levels different from the comparator levels to detect addresses and measure the lens position characteristic. For example, as shown in FIG. 27B, when the lens position characteristic is measured, the comparator levels a and b are raised to an extent that a gate can be generated in the RF difference signal waveform when there is no shift of the lens position. Doing so makes it possible to detect subtle waveform variations due to tiny shifts of the lens position, improve the accuracy of detecting the optimum lens position and provide highly reliable tracking control.

In the above-described fifth embodiment, when an RF difference signal amplitude of the address section is detected, the amplitude of the RF signal may change according to the address information recorded at the address section, causing an error in detection of the optimum lens position. Thus, when the address section of the optical disk is made up of address information and a repetition signal of a predetermined pattern for leading in PLL, it is desirable to measure the amplitude of an RF difference signal in the area where the predetermined pattern is repeated. Doing so makes it possible to improve the accuracy of detecting an optimum lens position and provide highly reliable tracking control.

Though not shown in the above-described first to sixth embodiments, the procedure for performing the tracking control explained in the first to sixth embodiments can be realized by hardware with a circuit using electronic parts, etc., or by a microcomputer or a host computer of the optical disk apparatus. When the procedure is executed by a microcomputer or a host computer, a computer-readable program (firmware) to execute the above procedure is stored in an information recording medium, etc., such as EEPROM and RAM.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for detecting reflected light of the optical beam obtained from the information storage medium and a moving part for moving the converging part across the information track, the tracking control apparatus comprising:

an address reading part for acquiring addresses recorded on the information storage medium through the output of the optical detecting part;

a first address reading deciding part for deciding that the address reading part has acquired the first address;

a second address reading deciding part for deciding that the address reading part has acquired the second address;

a lens position characteristic measuring part for successively generating offset set values so that the position of the converging part is moved by the moving part at predetermined spatial intervals and counting the number of times the decision results of both the first address reading deciding part and the second address reading deciding part show that the addresses have been acquired; and a lens shift adjusting part for searching for a maximum value of the acquisition count and moving the converging part using the moving part based on the offset set value when the acquisition count reaches a maximum value.

2. The tracking control apparatus according to claim 1, wherein the lens position characteristic measuring part acquires the acquisition count when the information storage medium is turned once or an integer multiple of times.

3. The tracking control apparatus according to claim 1, further comprising:

a tracking error signal generating part for detecting a track shift from the output of the optical detecting part; and an offset adjusting part for adjusting an offset of the tracking error signal generating part, wherein the lens position characteristic measuring part is operated after the offset adjusting part carries out offset adjustment.

4. The tracking control apparatus according to claim 1, further comprising:

a tracking error signal generating part for detecting a track shift from the output of the optical detecting part; and an offset adjusting part for adjusting an offset of the tracking error signal generating part, wherein the lens position characteristic measuring part is operated before the offset adjusting part carries out offset adjustment.

5. The tracking control apparatus according to claim 1, further comprising:

a tracking error signal generating part for detecting a track shift from the output of the optical detecting part; and an offset adjusting part for adjusting an offset of the tracking error signal generating part, wherein the offset adjusting part is operated according to the amount of movement of the converging part using the moving part.

6. The tracking control apparatus according to claim 1, wherein the information storage medium includes an information track formed of projections and depressions, the lens position characteristic measuring part measures the projections and depressions of the information track and the lens shift adjusting part moves the converging part to the projections and depressions based on the measurement result.

7. The tracking control apparatus according to claim 1, wherein the lens position characteristic measuring part and a lens shift adjusting part are operated according to the position of the information storage medium.

8. The tracking control apparatus according to claim 1, wherein the lens shift adjusting part includes an approximated function deciding part for deciding an approximated function from a relationship between the acquisition count and the offset set value and determining the offset set value when the position shift of the converging part with respect to the optical detecting part reaches a minimum from the approximated function.

9. The tracking control apparatus according to claim 1, wherein the lens shift adjusting part determines a range where the acquisition count becomes almost constant and regards the offset set value corresponding to the center of the range where the value becomes constant as the offset set value when the position shift with respect to the optical detecting part reaches a minimum.

10. The tracking control apparatus according to claim 1, wherein the lens position characteristic measuring part acquires the acquisition count, the output difference or the average value according to the rotation phase of the information storage medium.

11. The tracking control apparatus according to claim 1, wherein the lens shift adjusting part decides the offset set value according to the rotation phase of the information storage medium.

12. An optical disk apparatus comprising:

an optical head comprising a converging part for converging and irradiating an optical beam onto an information storage medium, an optical detecting part for detecting reflected light of the optical beam obtained from the information storage medium and a moving part for moving the converging part across the information track; and a tracking control apparatus specified in claim 1.

13. A tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control apparatus comprising:

a difference signal generating part for generating a difference signal of each detected signal divided and detected by the optical detecting part;

a first gate generating part for comparing the output of the difference signal generating part with a predetermined first level and generating a gate;

a second gate generating part for comparing the output of the difference signal generating part with a predetermined second level and generating a gate;

a lens position characteristic measuring part for successively generating offset set values for moving the position of the converging part using the moving part at predetermined spatial intervals and determining a measuring count based on the number of gates generated by the first gate generating part and the number of gates generated by the second gate generating part at respective positions to which the converging part has been moved; and a lens shift adjusting part for searching for the measuring count when a position shift of the converging part with respect to the optical detecting part reaches a minimum and moving the converging part using the moving part based on the offset set value corresponding to the searched measuring count.

14. The tracking control apparatus according to claim 13, wherein the measuring count is a sum of the number of gates generated by the first gate generating part and the number of gates generated by the second gate generating part and the measuring count when a position shift of the converging part with respect to the optical detecting part reaches a minimum is a maximum value of the sum of the number of gates.

15. The tracking control apparatus according to claim 13, wherein the measuring count is a difference between the number of gates generated by the first gate generating part and the number of gates generated by the second gate generating part and the measuring count when a position shift of the converging part with respect to the optical detecting part reaches a minimum is zero or a value closest to zero.

16. The tracking control apparatus according to claim 13, wherein the first gate generating part and the second gate generating part detect addresses using a level different from the first level and second level.

17. An optical disk apparatus comprising:

an optical head comprising a converging part for converging and irradiating an optical beam onto an information storage medium, an optical detecting part for detecting reflected light of the optical beam obtained from the information storage medium and a moving part for moving the converging part across the information track; and a tracking control apparatus specified in claim 13.

18. A tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control apparatus comprising:

a difference signal generating part for generating a difference signal of each detected signal divided and detected by the optical detecting part;

a peak detecting part for detecting a maximum value of the output of the difference signal generating part;

a bottom detecting part for detecting a minimum value of the output of the difference signal generating part;

a lens position characteristic measuring part for successively generating offset set values for moving the position of the converging part using the moving part at predetermined spatial intervals and obtaining a calculation value based on the detected value of the peak detecting part and the detected value of the bottom detecting part at respective positions to which the converging part has been moved; and a lens shift adjusting part for searching for the calculation value when a position shift of the converging part with respect to the optical detecting part reaches a minimum and moving the converging part using the moving part based on the offset set value corresponding to the searched calculation value.

19. The tracking control apparatus according to claim 18, wherein when the detected value of the peak detecting part and the detected value of the bottom detecting part are expressed as TEmax and TEmin, respectively, the calculation value is (TEmax+TEmin)/(TEmax−TEmin) and the calculation value when a position shift of the converging part with respect to the optical detecting part reaches a minimum is zero or a value closest to zero.

20. An optical disk apparatus comprising:

an optical head comprising a converging part for converging and irradiating an optical beam onto an information storage medium, an optical detecting part for detecting reflected light of the optical beam obtained from the information storage medium and a moving part for moving the converging part across the information track; and a tracking control apparatus specified in claim 18.

21. A tracking control apparatus for controlling an optical head comprising a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control apparatus comprising:

a difference signal generating part for generating a difference signal of each detected signal divided and detected by the optical detecting part;

a first address amplitude detecting part for detecting an amplitude of the first address section from the output of the difference signal generating part;

a second address amplitude detecting part for detecting an amplitude of the second address section from the output of the difference signal generating part;

a lens position characteristic measuring part for successively generating offset set values for moving the position of the converging part using the moving part at predetermined spatial intervals and calculating a difference between the output of the first address amplitude detecting part and the output of the second address amplitude detecting part at their respective positions to which the converging part has been moved; and a lens shift adjusting part for searching for the output difference which is zero or a value closest to zero and moving the converging part using the moving part based on the offset set value when the output difference becomes zero or reaches a maximum value closest to zero.

22. The tracking control apparatus according to claim 21, wherein the first address amplitude detecting part and the second address amplitude detecting part detect the amplitude at predetermined locations where the amplitude becomes almost constant at the first address section and second address section of the information storage medium.

23. An optical disk apparatus comprising:
an optical head comprising a converging part for converging and irradiating an optical beam onto an information storage medium, an optical detecting part for detecting reflected light of the optical beam obtained from the information storage medium and a moving part for moving the converging part across the information track; and
a tracking control apparatus specified in claim 21.

24. A tracking control apparatus for controlling an optical head comprising a converging part for converging and irradiating an optical beam onto an information storage medium having a first areas and a second area exhibiting different reflection characteristics when an optical beam is irradiated to perform optical recording and/or reproduction on the information storage medium, an optical detecting part for dividing and detecting reflected light of the optical beam obtained from the information storage medium and a moving part for moving the converging part across the information track, the tracking control apparatus comprising:
a difference signal generating part for generating a difference signal of each detected signal divided and detected by the optical detecting part;
an offset measuring part for measuring an average value during a predetermined period of the difference signal;
a lens position characteristic measuring part for successively generating offset set values for moving the position of the converging part using the moving part at predetermined spatial intervals and calculating the average value at their respective positions to which the converging part has been moved for the first area and second area of the information storage medium; and
a lens shift adjusting part for searching for the average value when the position shift of the converging part with respect to the optical detecting part reaches a minimum from a relationship between the offset set value obtained in the first area of the information storage medium and the average value and a relationship between the offset set value obtained in the second area and the average value and moving the converging part using the moving part based on the offset set value corresponding to the searched average value.

25. The tracking control apparatus according to claim 24, wherein the lens shift adjusting part obtains a first function indicating a relationship between the offset set value obtained in the first area of the information storage medium and the average value and a second function indicating a relationship between the offset set value obtained in the second area and the average value and moves the converging part using the moving part based on the offset set value calculated from a point of intersection between the first function and second function.

26. An optical disk apparatus comprising:
an optical head comprising a converging part for converging and irradiating an optical beam onto an information storage medium, an optical detecting part for detecting reflected light of the optical beam obtained from the information storage medium and a moving part for moving the converging part across the information track; and
a tracking control apparatus specified in claim 24.

27. A tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for detecting reflected light of the optical beam obtained from the information storage medium and a moving part for moving the converging part across the information track, the tracking control method comprising the step of:
successively generating offset set values so that the position of the converging part is moved by the moving part at predetermined spatial intervals and counting the number of times the first address and the second address have been acquired at respective positions to which the converging part has been moved; and
searching for a maximum value of the acquisition count and moving the converging part using the moving part based on the offset set value when the acquisition count reaches a maximum value.

28. A computer-readable recording medium that records a program for performing each step recited in the method according to claim 27.

29. A tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control method comprising the steps of:
generating a difference signal of each detected signal divided and detected by the optical detecting part;
comparing the difference signal with a first level and a second level and generating a first gate and a second gate when the difference signal exceeds the first level and the second level;
successively generating offset set values for moving the position of the converging part using the moving part at predetermined spatial intervals and determining a measuring count based on the generated first gate and the generated second gate at respective positions to which the converging part has been moved; and
searching for the measuring count when a position shift of the converging part with respect to the optical detecting part reaches a minimum and moving the converging part using the moving part based on the offset set value corresponding to the searched measuring count.

30. The tracking control method according to claim 29, wherein the measuring count is a sum of the number of the first gate and the number of the second gate and the measuring count when a position shift of the converging part with respect to the optical detecting part reaches a minimum is a maximum value of the sum of the number of gates.

31. The tracking control method according to claim 30, wherein the measuring count is a difference between the number of the first gate and the number of the second gate and the measuring count when a position shift of the converging part with respect to the optical detecting part reaches a minimum is zero or a value closest to zero.

32. A computer-readable recording medium that records a program for performing each step recited in the method according to claim 29.

33. A tracking control method for controlling an optical head which comprises a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control method comprising the steps of:

generating a difference signal of each detected signal divided and detected by the optical detecting part;

detecting a maximum value and a minimum value of the difference signal;

successively generating offset set values for moving the position of the converging part using the moving part at predetermined spatial intervals and obtaining a calculation value based on the maximum value and the minimum value; and searching for the calculation value when a position shift of the converging part with respect to the optical detecting part reaches a minimum and moving the converging part using the moving part based on the offset set value corresponding to the searched calculation value.

34. The tracking control method according to claim 33, wherein when the detected value of the peak detecting part and the detected value of the bottom detecting part are expressed as TEmax and TEmin, respectively, the calculation value is (TEmax+TEmin)/(TEmax−TEmin) and the calculation value when a position shift of the converging part with respect to the optical detecting part reaches a minimum is zero or a value closest to zero.

35. A computer-readable recording medium that records a program for performing each step recited in the method according to claim 33.

36. A tracking control method for controlling an optical head which compares a converging part for converging and irradiating an optical beam onto an information storage medium having a first address and a second address shifted from an information track toward the inner radius side and outer radius side by approximately ½ track, respectively to perform optical recording and/or reproduction on the information storage medium, an optical detecting part for dividing and detecting reflected light of the optical beam obtained from the information storage medium and a moving part for moving the converging part across the information track, the tracking control method comprising the steps of:

generating a difference signal of each detected signal divided and detected by the optical detecting part;

detecting an amplitude of the difference signal at the first address section and an amplitude of the difference signal at the second address section;

successively generating offset set values for moving the position of the converging part using the moving part at predetermined spatial intervals and calculating a difference between the amplitude at first address section and the amplitude at the second address section, at their respective positions to which the converging part has been moved; and searching for the output difference which is zero or a value closest to zero and moving the converging part using the moving part based on the offset set value when the output difference becomes zero or reaches a maximum value closest to zero.

37. A computer-readable recording medium that records a program for performing each step recited in the method according to claim 36.

38. A tracking control method for controlling an optical head which comprises a converging part for converging and irradiating an optical beam onto an information storage medium having a first areas and a second area exhibiting different reflection characteristics when an optical beam is irradiated to perform optical recording and/or reproduction on the information storage medium, an optical detecting part for dividing and detecting reflected light of the optical beam obtained from the information storage medium and a moving part for moving the converging part across the information track, the tracking control method comprising the steps of:

generating a difference signal of each detected signal divided and detected by the optical detecting part;

measuring an average value of the difference signal during a predetermined period;

successively generating offset set values for moving the position of the converging part using the moving part at predetermined spatial intervals and calculating the average value at their respective positions to which the converging part has been moved for the first area and second area of the information storage medium; and searching for the average value when the position shift of the converging part with respect to the optical detecting part reaches a minimum from a relationship between the offset set value obtained in the first area of the information storage medium and the average value and a relationship between the offset set value obtained in the second area and the average value and moving the converging part using the moving part based on the offset set value corresponding to the searched average value.

39. The tracking control method according to claim 38, wherein the searching step comprises the step of:

obtaining a first function indicating a relationship between the offset set value obtained in the first area of the information storage medium and the average value and a second function indicating a relationship between the offset set value obtained in the second area and the average value; and moving the converging part using the moving part based on the offset set value calculated from a point of intersection between the first function and second function.

40. A computer-readable recording medium that records a program for performing each step recited in the method according to claim 38.

* * * * *